United States Patent [19]

Tukamoto et al.

[11] Patent Number: 5,581,138
[45] Date of Patent: Dec. 3, 1996

[54] COMPACT MOTOR WITH SPEED REDUCING MECHANISM

[75] Inventors: Kou Tukamoto, Toki; Naohiko Nagase, Tajimi; Shin-ichiro Matsumoto, Toyonaka, all of Japan

[73] Assignee: Matsushita Electric Industrial Co., Ltd., Japan

[21] Appl. No.: 237,831

[22] Filed: May 4, 1994

[30] Foreign Application Priority Data

Jun. 21, 1993 [JP] Japan .................................. 5-174720
Jul. 13, 1993 [JP] Japan .................................. 5-196835

[51] Int. Cl.$^6$ .............................. H02K 7/06; H02K 7/10
[52] U.S. Cl. .................. 310/83; 310/78; 310/38
[58] Field of Search .......................... 310/83, 78, 37, 310/38, 99, 100; 192/56; 74/34, 54, 55; 15/250.3, 250.16

[56] References Cited

U.S. PATENT DOCUMENTS

| | | | |
|---|---|---|---|
| 2,604,764 | 7/1952 | Smith | 64/30 |
| 3,016,766 | 1/1962 | Hoyler | 74/588 |
| 3,022,373 | 2/1962 | Levine | 178/6.6 |
| 3,681,812 | 8/1972 | Colucci | 15/250.3 |
| 3,782,515 | 1/1974 | Cowen, Jr. | 192/56 C |
| 4,466,153 | 8/1984 | Seibicke | 15/250.16 |
| 4,741,067 | 5/1988 | Jambor et al. | 15/250.16 |
| 4,774,423 | 9/1988 | Karasawa et al. | 310/78 |
| 5,274,876 | 1/1994 | Wehrspann | 15/250.17 |

FOREIGN PATENT DOCUMENTS 1462571 1/1977 United Kingdom.
2150666 7/1985 United Kingdom.

OTHER PUBLICATIONS

United Kingdom Search Report dated Jul. 22, 1994 (1 page).
Examiner's Report dated Jul. 26, 1994 (2 pages).

*Primary Examiner*—Steven L. Stephan
*Assistant Examiner*—Jonathan Link

[57] ABSTRACT

Disclosed herein is a compact motor with a speed reducing mechanism, including a cylindrical casing having an open end, a stator fixedly provided in the casing, an exciting coil provided in the casing, a rotor provided in the casing and having a high-speed output shaft on which a pinion is fixed, a cover for covering the open end of the casing, a low-speed output shaft projecting from a hole formed through the cover, and a reduction gear train interposed between the pinion and the low-speed output shaft for transmitting power to the low-speed output shaft. The compact motor further includes a lever connected to the low-speed output shaft; an eccentric cylinder formed integrally with a final gear of the reduction gear train and adapted to eccentrically rotate about a gear shaft for rotatably supporting the final gear; and a connecting member having one end pivotally engaging with an outer circumference of the eccentric cylinder and another end pivotally engaging with the lever. Accordingly, the low-speed output shaft itself can be oscillated. Further, in the event that an overload is applied to the low-speed output shaft during oscillation, breakage of the intermediate transmission members can be prevented, and an oscillatory position of the low-speed output shaft can be kept unchanged.

7 Claims, 20 Drawing Sheets

COMPACT MOTOR WITH SPEED REDUCING MECHANISM

BACKGROUND OF THE INVENTION

1. Field of the Invention

The present invention relates to a compact motor with a speed reducing mechanism and, more particularly, to such a compact motor having a function of oscillating a low-speed output shaft.

2. Description of the Related Art

A louver of an air conditioner, for example, is periodically oscillated to change a blowing direction of cool air or the like generated in the air conditioner, thereby uniformly circulate the cool air in a room.

FIG. 20 shows a drive mechanism for such a louver of an air conditioner in the related art.

As shown in FIG. 20, three louvers 71, 72, and 73 are rotatably supported at their lower and upper shaft portions 74 and 75 through bearings 78 to lower and upper boards 76 and 77. Lever pins 79 are formed on the louvers 71, 72, and 73. The lever pins 79 are rotatably inserted in holes 91 formed through an oscillating lever 90.

The oscillating lever 90 is supported by a guide (not shown) so as to be linearly reciprocatable in a direction of double-headed arrow F. The oscillating lever 90 is provided with a driven hole 92. A crank 93 bent eccentrically from an output shaft 100a of a compact motor 100 with a speed reducing mechanism is inserted in the driven hole 92 of the oscillating lever 90.

The oscillating operation of the louvers of the air conditioner mentioned above will be described.

The output shaft 100a of the compact motor 100 is rotated at a low speed, and the crank 93 formed at the end of the output shaft 100a is rotated so as to draw a large circle as shown by an arrow P in FIG. 20.

The driven hole 92 of the oscillating lever 90 is elongated in a direction perpendicular to the direction F, so that the rotation of the crank 93 is converted into reciprocation of the oscillating lever 90 in the direction F. The reciprocation of the oscillating lever 90 is converted into repeated oscillation of the louvers 71, 72, and 73 about the axes of the shaft portions 74 and 75 by the engagement of the lever pins 79 with the holes 91. Thus, the cool air generated in the air conditioner can be uniformly circulated in a room.

Incidentally, when an overload is applied to the louver, the intermediate transmission members are possibly broken because of a problem of strength or mechanism. Various means of preventing such breakage have conventionally been applied to the louver.

As a means of preventing such breakage due to the problem of mechanism, a torque limiter such as a friction clutch is applied.

The above-mentioned compact motor used to drive the louver of the air conditioner in the related art has the following problems.

(1) The oscillating mechanism for the louver of the air conditioner includes many parts to cause an increase in cost. Furthermore, the oscillating mechanism has a large size, which cannot meet the requirement of reduction in size of the air conditioner.

The cool air generated in the air conditioner blows directly against the louver and the oscillating mechanism to generate dew on the louver and the oscillating mechanism. Accordingly, the drops of dew cause deterioration in insulating performance of electrical parts located under the louver and the oscillating mechanism and also cause the generation of rust.

Further, since the cool air blows against the oscillating mechanism, the flow of the cool air is disturbed by the oscillating mechanism. That is, the flow of the cool air cannot be supplied as a regular flow, thus reducing the performance of the air conditioner.

(2) The friction clutch has a disc plate connected to the low-speed output shaft and a friction plate adapted to slide on the disc plate, thereby preventing an overload applied to the low-speed output shaft from being transmitted to a reduction gear train in the compact motor. When the overload applied to the output shaft is removed, the sliding of the friction plate is stopped. However, the rotational positional relationship between the output shaft and the friction plate slips at this time from the original positional relationship prior to operation of the friction clutch. Accordingly, when the output shaft is restarted to rotate, an operational position of the louver is changed, which becomes a serious problem because an accurate oscillatory angle of the louver must be maintained in the air conditioner.

SUMMARY OF THE INVENTION

It is accordingly an object of the present invention to provide a compact motor with a speed reducing mechanism which can effect oscillation of the low-speed output shaft.

It is another object of the present invention to provide a compact motor with a speed reducing mechanism which can prevent breakage of the intermediate transmission members and can keep an oscillatory position of the low-speed output shaft unchanged even when an overload is applied to the low-speed output shaft.

According to the present invention, there is provided in a compact motor with a speed reducing mechanism, including a cylindrical casing having an open end, a stator fixedly provided in the casing, an exciting coil provided in the casing, a rotor provided in the casing and having a high-speed output shaft on which a pinion is fixed, a cover for covering the open end of the casing, a low-speed output shaft projecting from a hole formed through the cover, and a reduction gear train interposed between the pinion and the low-speed output shaft for transmitting power to the low-speed output shaft; the improvement comprising a lever connected to the low-speed output shaft; an eccentric cylinder formed integrally with a final gear of the reduction gear train and adapted to eccentrically rotate about a gear shaft for rotatably supporting the final gear; and a connecting member having one end pivotally engaging with an outer circumference of the eccentric cylinder and another end pivotally engaging with the lever.

In an aspect of the present invention the connecting member has a circular hole pivotally engaging with a support shaft, so that the connecting member is oscillated about the support shaft.

In another aspect of the present invention the compact motor further comprises a torque limiter interposed between the low-speed output shaft and the lever, wherein the low-speed output shaft is fixed to an output of the torque limiter at a central position thereof, and the lever is fixed to an input of the torque limiter at a position eccentric from the central position.

In a further aspect of the present invention the connecting member has a first elongated hole pivotally engaging with the outer circumference of the eccentric cylinder, a second elongated hole pivotally engaging with the lever, and a circular hole pivotally engaging with a support shaft, so that the connecting member is oscillated about the support shaft.

In operation, when the coil is excited by supplying current thereto, the stator gives torque to the rotor formed of permanent magnet. Accordingly, the pinion formed on the high-speed output shaft of the rotor transmits high-speed rotation to the reduction gear train.

Each gear of the reduction gear train is composed of a wheel and a pinion united together. Thus, the torque of the rotor is transmitted from the pinion of the rotor through the intermediate gears of the reduction gear train to the final gear of the reduction gear train with a high rotational speed being gradually reduced.

The eccentric cylinder is formed integrally with the final gear of the reduction gear train. Accordingly, the low-speed rotation of the final gear about the gear shaft rotatably supporting it gives eccentric rotation of the eccentric cylinder about the gear shaft.

The connecting member is pivotally connected with the eccentric cylinder and the lever, so that the eccentric rotation of the eccentric cylinder is converted into an oscillatory motion of the connecting member and the oscillatory motion is transmitted to the lever. Then, the low-speed output shaft connected to the lever is repeatedly oscillated by the repeated oscillation of the lever.

In the event that an overload is applied to the low-speed output shaft to stop it, the torque limiter interposed between the low-speed output shaft and the lever operates to allow the oscillation of the lever and accordingly allow the rotation of the final gear.

When the overload applied to the low-speed output shaft is removed, a coupling member biased by a spring member provided in the torque limiter restores a plurality of predetermined oscillatory positions to restart oscillation of the low-speed output shaft from its given oscillatory position. Thus, when the low-speed output shaft is restarted, the predetermined positional relationship between the low-speed output shaft and the final gear can be kept unchanged.

As described above, the compact motor according to the present invention includes the lever connected to the low-speed output shaft, the eccentric cylinder formed integrally with the final gear of the reduction gear train, and the connecting member for pivotally connecting the eccentric cylinder with the lever. With this arrangement, the low-speed output shaft can be stably oscillated.

Accordingly, the low-speed output shaft of the compact motor can be directly connected to a louver of an air conditioner. In this case, cool air from the air conditioner is blocked by the cover of the compact motor and is prevented from coming to direct contact with the speed reducing mechanism in the compact motor, thereby preventing the generation of dew on the oscillating mechanism in the compact motor. Accordingly, no waterproof and dustproof covers are required, and the oscillating mechanism can be made compact.

Preferably, the compact motor according to the present invention further includes a cam member fixed to the low-speed output shaft, a coupling member fixed to the lever, and a spring member retained in the coupling member so as to bias the cam member. With this arrangement, even when an overload is applied to the low-speed output shaft, breakage of the intermediate transmission members due to the overload can be prevented, and slippage of an oscillatory angle of the low-speed output shaft can also be prevented.

Other objects and features of the invention will be more fully understood from the following detailed description and appended claims when taken with the accompanying drawings.

DESCRIPTION OF THE PREFERRED EMBODIMENTS

There will now be described some preferred embodiments of the present invention with reference to the drawings.

Figure 1:
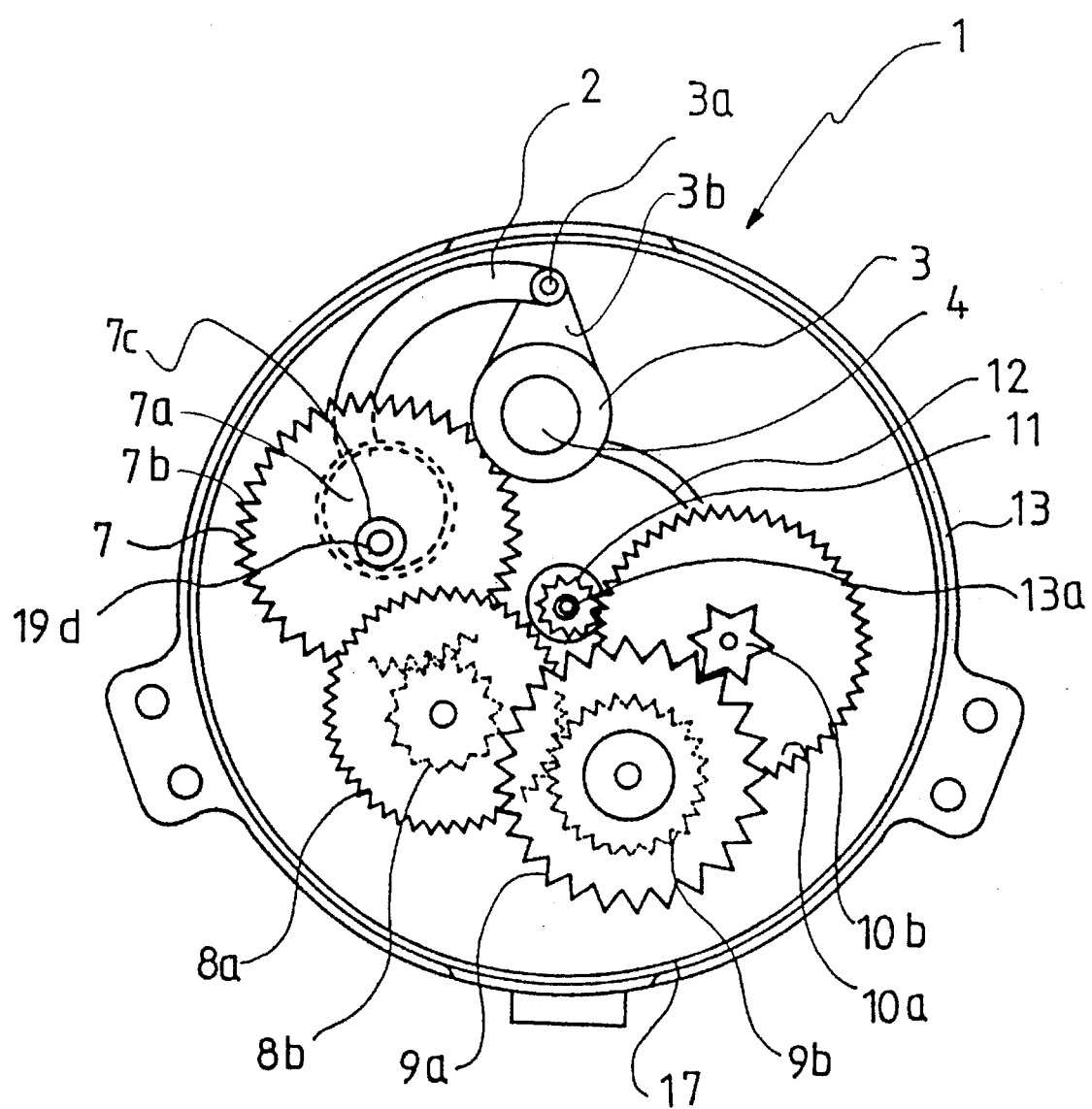
FIG. 1 is a plan view showing the internal structure of a compact motor with a speed reducing mechanism in a first preferred embodiment according to the present invention.
Figure 2:
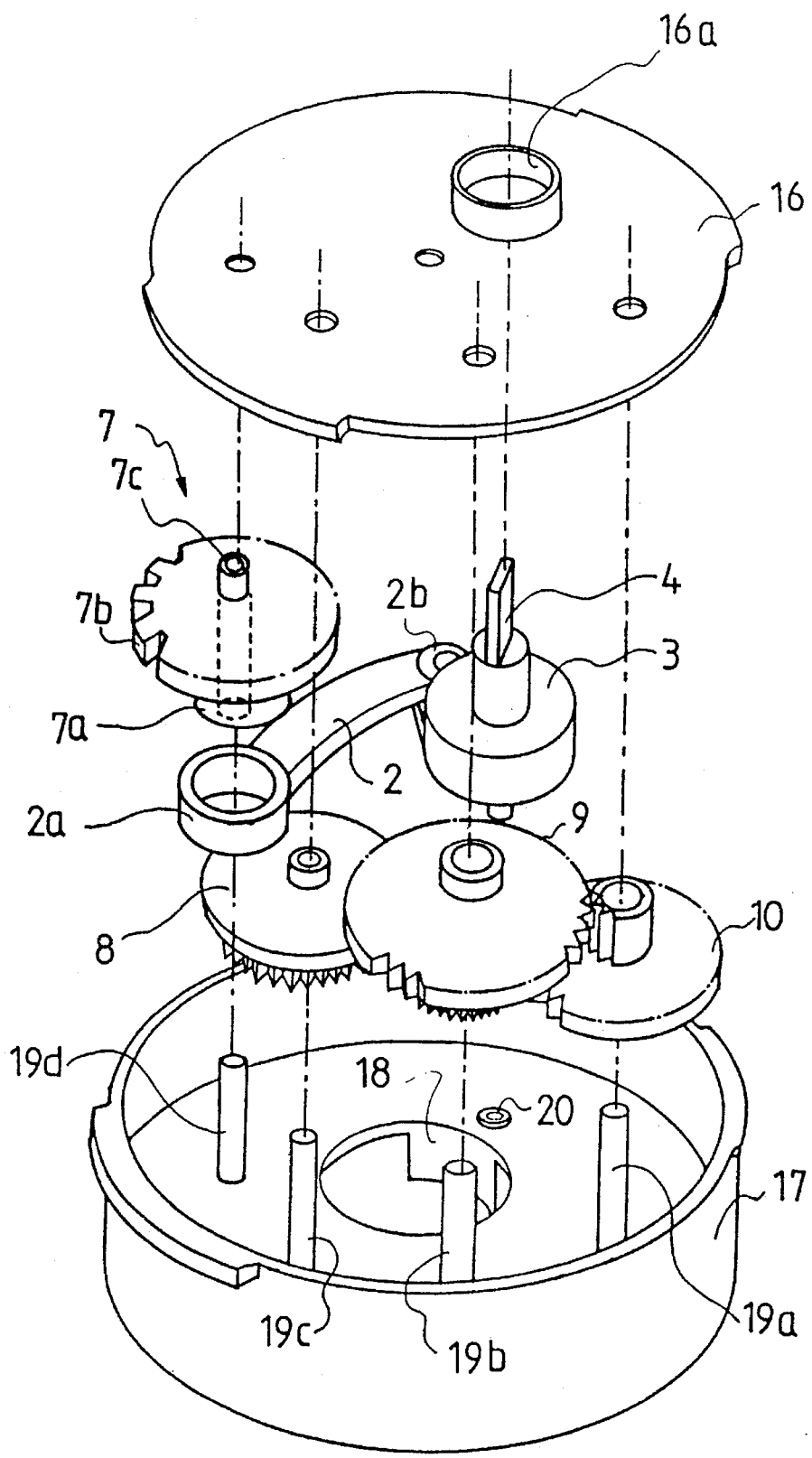
FIG. 2 is an exploded perspective view of a gear case section of the compact motor shown in FIG. 1.
Figure 3:
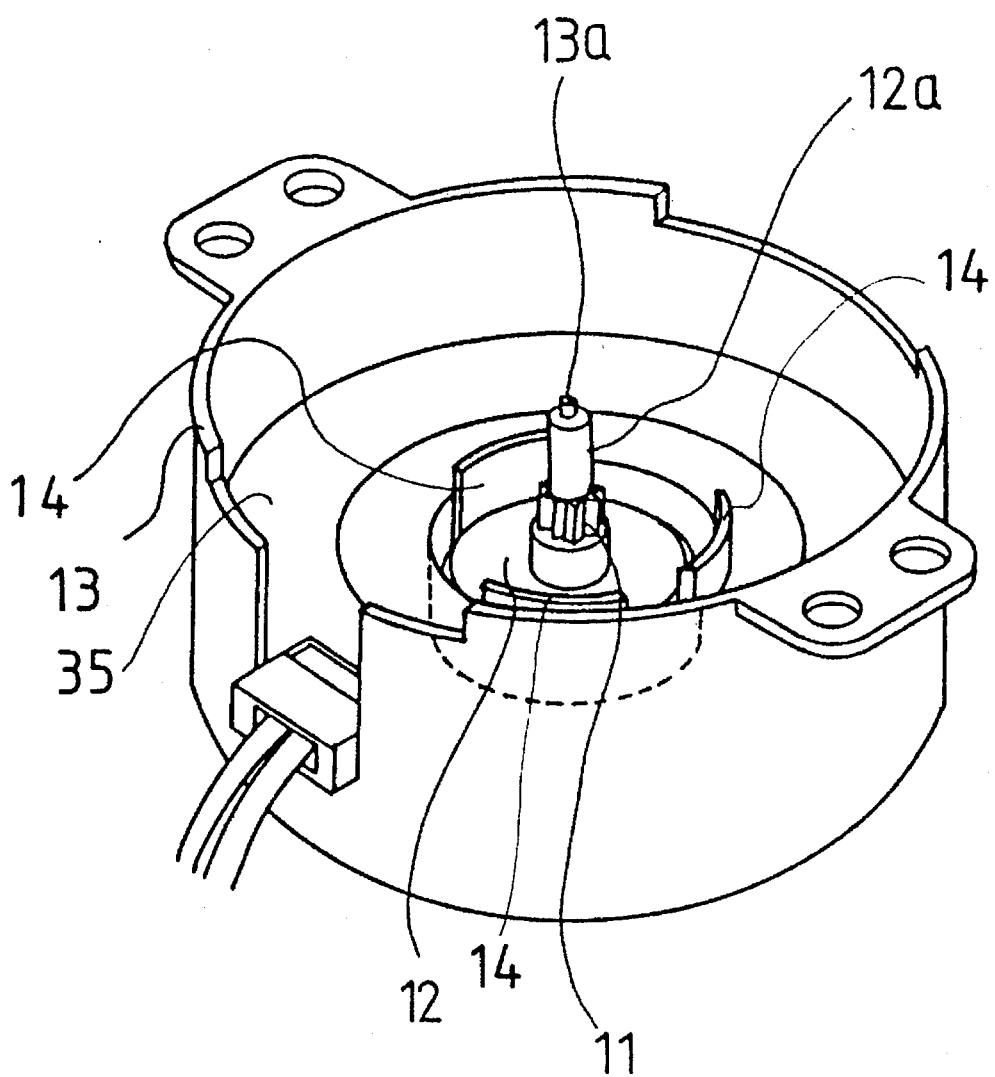
FIG. 3 is a perspective view of a motor section of the compact motor shown in FIG. 1.

FIG. 1 is a plan view showing the internal structure of a compact motor 1 with a speed reducing mechanism in a first preferred embodiment according to the present invention. FIG. 2 shows a gear case section of the compact motor 1, and FIG. 3 shows a motor section of the compact motor 1. The gear case section shown in FIG. 2 and the motor section shown in FIG. 3 are combined to obtain the compact motor 1.

Referring to FIG. 3, reference numeral 13 denotes a cylindrical casing open at an upper end thereof and having a bottom plate portion. The casing 13 is formed by deep drawing of an iron sheet with use of a press. A plurality of stators 14 according to the number of poles of the motor are fixedly mounted to the bottom plate portion of the casing 13 so as to project upward therefrom. An exciting coil 35 is mounted around the stators 14 in the casing 13. A support shaft 13a is fixed by press fit to the bottom plate portion of the casing 13 at the center thereof so as to stand upright therefrom. A rotor 12 is rotatably mounted on the support shaft 13a. A high-speed output shaft 12a of the rotor 12 is formed integrally with a pinion 11 made of resin.

Referring to FIG. 2, reference numeral 17 denotes a cylindrical gear case open at an upper end thereof and having a centrally holed bottom plate portion. The gear case 17 is so shallow as to be fixedly mounted inside the casing 13 shown in FIG. 3 over the stators 14. Four gear shafts 19a, 19b, 19c, and 19d for rotatably supporting a reduction gear train are fixed by press fit to the bottom plate portion of the gear case 17 so as to stand upright therefrom. A metal bearing 20 is fixed by press fit to the bottom plate portion of the gear case 17. A lower shaft portion 4a of a low-speed output shaft 4 is rotatably engaged with the metal bearing 20. A plurality of stators 18 are formed around the central hole of the bottom plate portion of the gear case 17 so as to project downward therefrom.

A first reduction gear 10 is rotatably mounted on the gear shaft 19a; a second reduction gear 9 is rotatably mounted on the gear shaft 19b; a third reduction gear 8 is rotatably mounted on the gear shaft 19c; and a fourth reduction gear 7 is rotatably mounted on the gear shaft 19d.

As shown in FIG. 1, a first wheel 10a of the first reduction gear 10 meshes with the pinion 11 formed integrally with the high-speed output shaft 12a of the rotor 12. A second wheel 9a of the second reduction gear 9 meshes with a first pinion 10b coaxially fixed to the first wheel 10a. A third wheel 8a of the third reduction gear 8 meshes with a second pinion 9b coaxially fixed to the second wheel 9a. A fourth wheel 7b of the fourth reduction gear 7 as a final gear meshes with a third pinion 8b coaxially fixed to the third wheel 8a.

Figure 4:
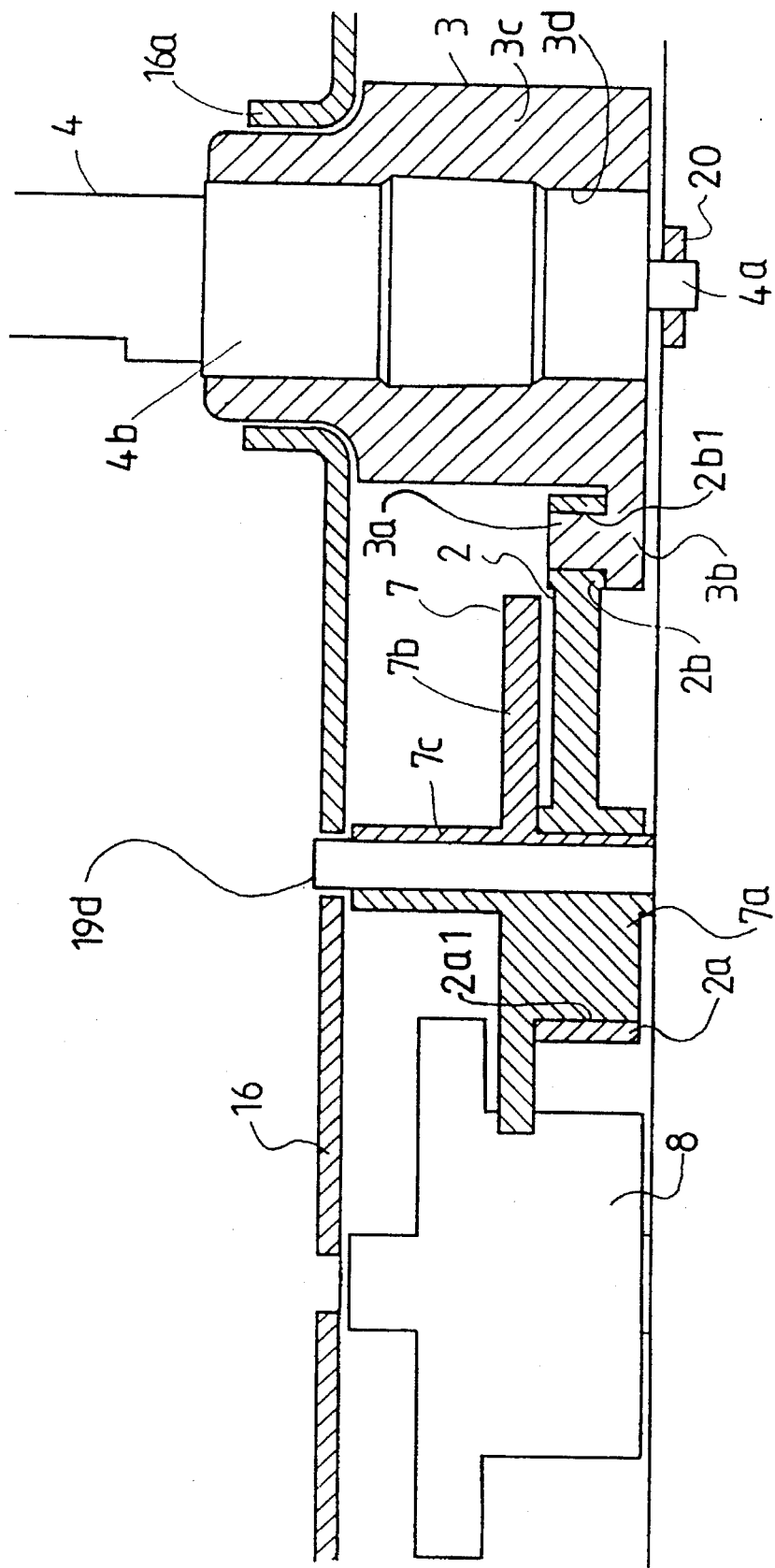
FIG. 4 is a vertical sectional view of an essential part of the compact motor shown in FIG. 1.

As shown in FIGS. 2 and 4, an eccentric cylinder 7a eccentric from the gear shaft 19d is formed on the lower surface of the fourth wheel 7b of the fourth reduction gear 7. As mentioned above, the lower shaft portion 4a of the low-speed output shaft 4 is rotatably supported to the metal bearing 20. An upper shaft portion 4b of the low-speed output shaft 4 is fixedly engaged with a lever 3.

The lever 3 comprises a hub portion 3c provided with a hole 3d, a substantially triangular portion 3b projecting sideward from a lower end portion of the hub portion 3c, and a projection 3a projecting upward from the triangular portion 3b at an outer end thereof. The upper shaft portion 4b of the low-speed output shaft 4 is fixedly engaged with the hole 3d of the hub portion 3c of the lever 3.

Reference numeral 18 denotes a cover for covering the upper opening of the casing 13 shown in FIG. 3 enclosing the gear case 17. The cover 16 has a bearing hole 16a formed by drawing, for bearing the upper shaft portion 4b of the low-speed output shaft 4 through the hub portion 3c of the lever 3.

Reference numeral 2 denotes an arcuate connecting bar for connecting the lever 3 with the eccentric cylinder 7a. The connecting bar 2 has a pair of connecting portions 2a and 2b at both ends. The connecting portion 2a has a circular hole 2a1 in which the eccentric cylinder 7a is rotatably engaged, and the connecting portion 2b has a circular hole 2b1 in which the projection 3a of the lever 3 is rotatably engaged.

The operation of the speed reducing mechanism of the compact motor 1 is as follows:

When the coil 13b is excited by supplying current thereto, the rotor 12 is rotated at a high speed. The rotation of the rotor 12 is transmitted through the pinion 11 and the intermediate reduction gears 10, 9, and 8 to the final reduction gear 7, thereby obtaining a low speed of the final reduction gear 7.

The operation of an oscillating mechanism constituting an essential part in the first preferred embodiment will now be described with reference to FIGS. 5 and 6.

When the fourth reduction gear 7 is rotated at a low speed, the eccentric cylinder 7a is eccentrically rotated together about the gear shaft 19d.

Figure 6:
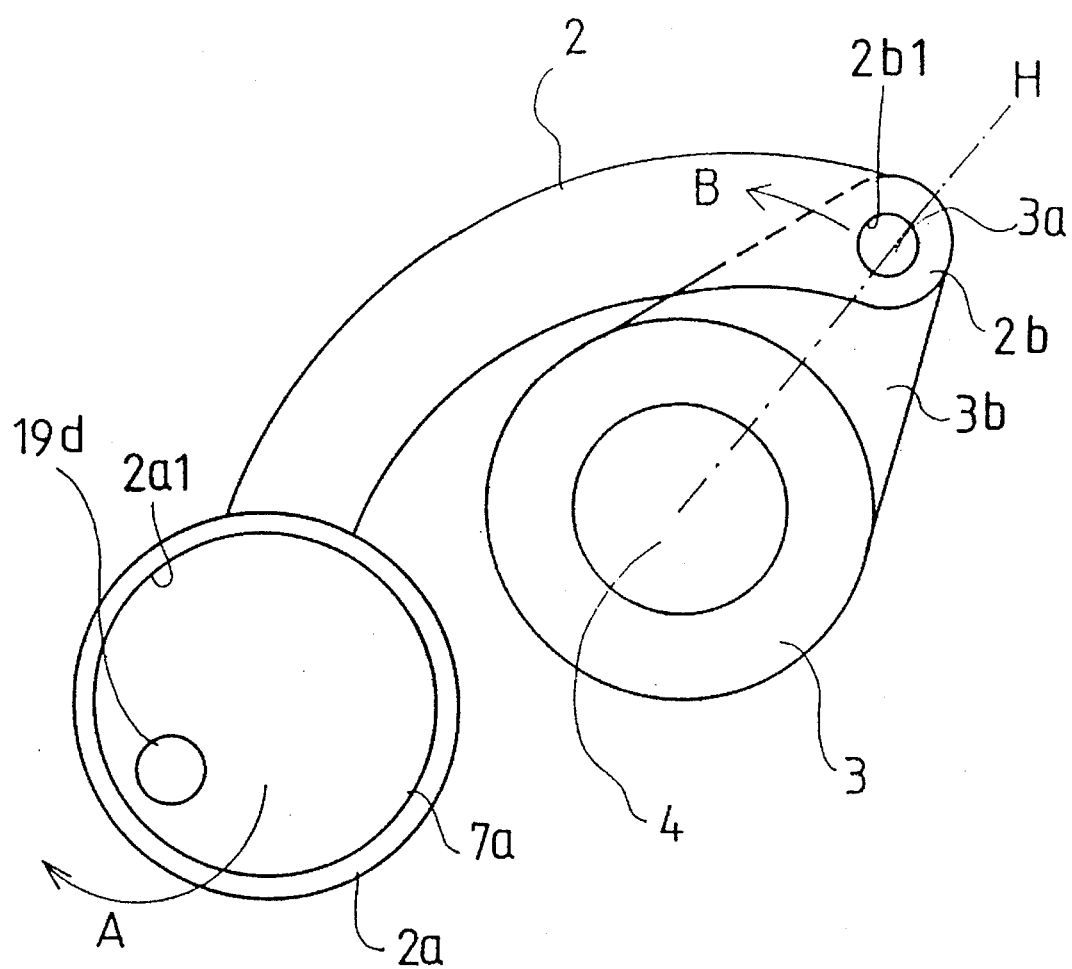

Referring to FIG. 6, when the eccentric cylinder 7a is arcuately rotated about the gear shaft 19d in a direction of arrow A, the projection 3a of the lever 3 in a position H is arcuately moved in a direction of arrow B through the connecting bar 2.

Figure 5:
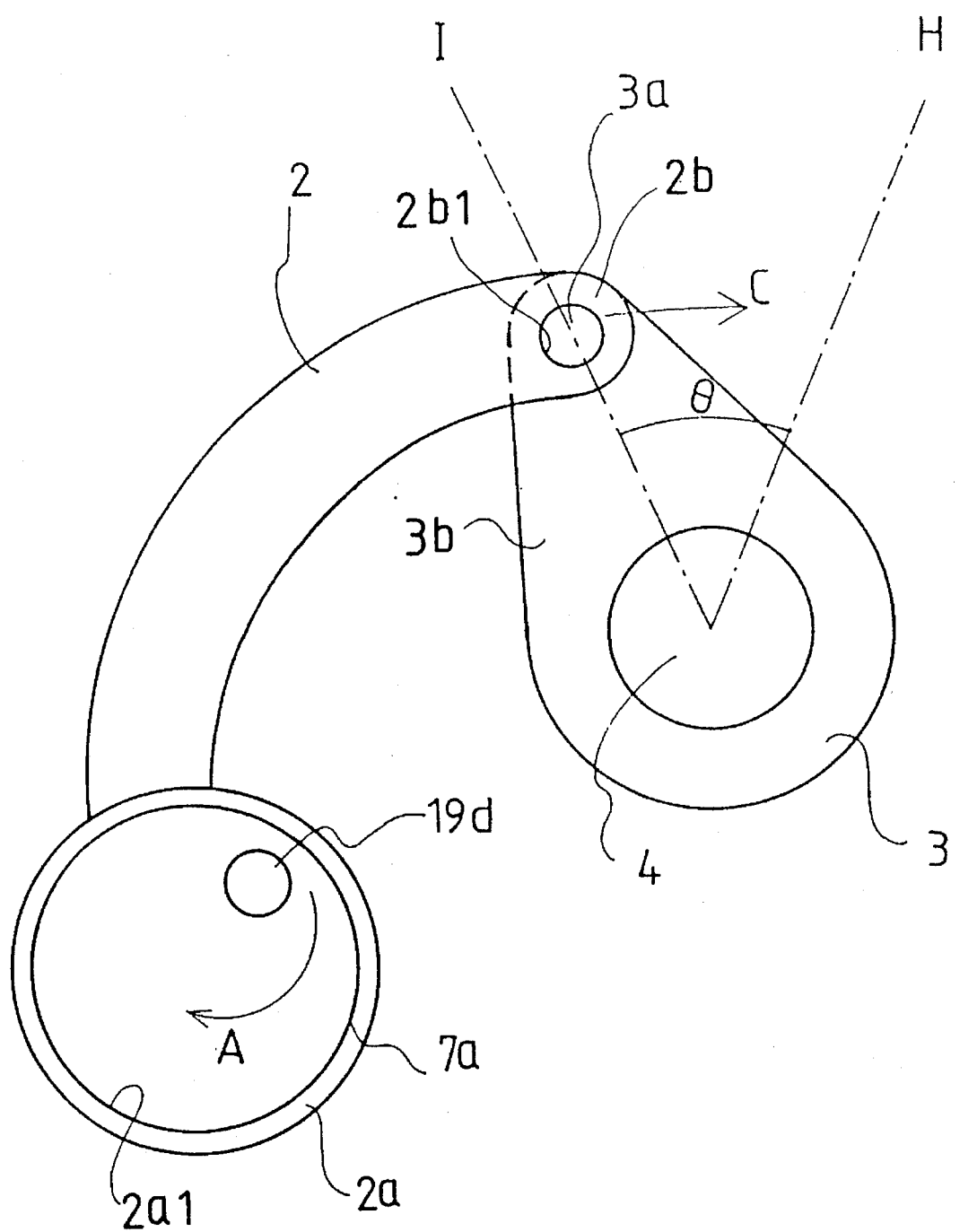
FIGS. 5 and 6 are schematic plan views illustrating the operation of the essential part shown in FIG. 4.

Thereafter, when the eccentric cylinder 7a comes to a position shown in FIG. 5 which is in point symmetry with the position shown in FIG. 6 with respect to the gear shaft 19d, the projection 3a of the lever 3 comes to a position I shown in FIG. 5.

That is, when the eccentric cylinder 7a is rotated at 180°, the projection 3a of the lever 3 is swung at a given angle θ from the position H to the position I about the axis of the low-speed output shaft 4. Thereafter, when the eccentric cylinder 7a is arcuately rotated about the gear shaft 19d in a direction of arrow A shown in FIG. 5, the projection 3a of the lever 3 is returned in a direction of arrow C from the position I to the position H.

Accordingly, when the eccentric cylinder 7a is rotated at 380°, the lever 3 is oscillated at the given angle θ(=about 60°) about the axis of the low-speed output shaft 4. Then, a continuous rotation of the eccentric cylinder 7 is converted into a repeated oscillation of the lever 3 at the given angle θ.

Thus, the low-speed output shaft 4 fixed to the lever 3 is repeatedly oscillated at the given angle θ at a low speed. The given angle θ of oscillation of the low-speed output shaft 4 may be arbitrarily changed by changing the amount of eccentricity of the eccentric cylinder 7a, the distance from the axis of the low-speed output shaft 4 to the projection 3a, or the length of the connecting bar 2.

According to the oscillating mechanism constituted of the eccentric cylinder 7a, the lever 3, and the connecting bar 2 lined together, stable eccentric rotation of the eccentric cylinder 7a can be effected because the eccentric cylinder 7a is formed integrally with the fourth reduction gear 7 as the final gear. Accordingly, stable oscillatory motion of the low-speed output shaft 4 can be effected.

Accordingly, a louver of an air conditioner can be directly mounted to the low-speed output shaft 4 of the compact motor 1.

Figure 19:
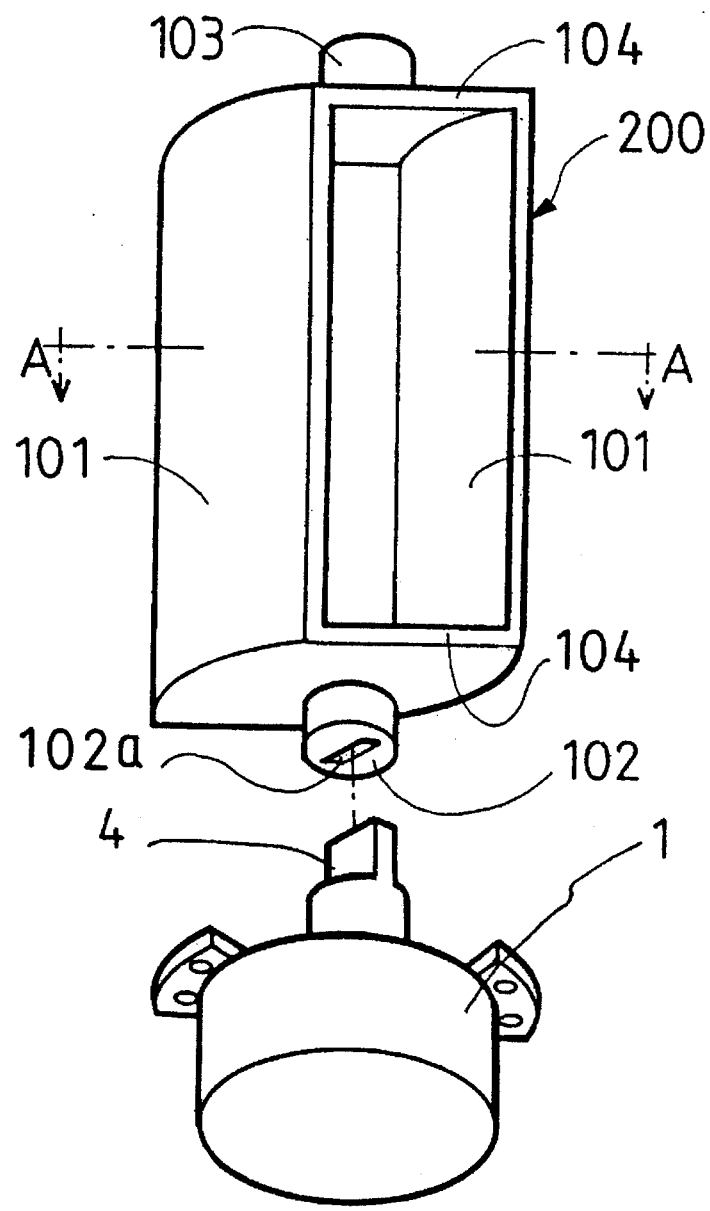
FIG. 19A is a perspective view of a louver to be directly connected to the compact motor according to the present invention.
FIG. 19B is a cross section taken along the line A—A in FIG. 19A.
Figure 19:
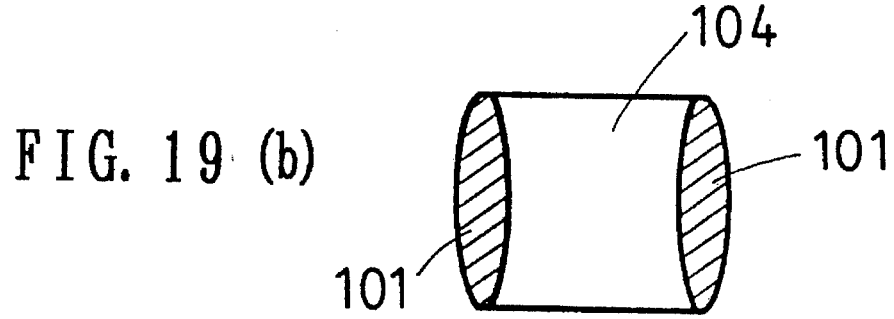
Figure 20:
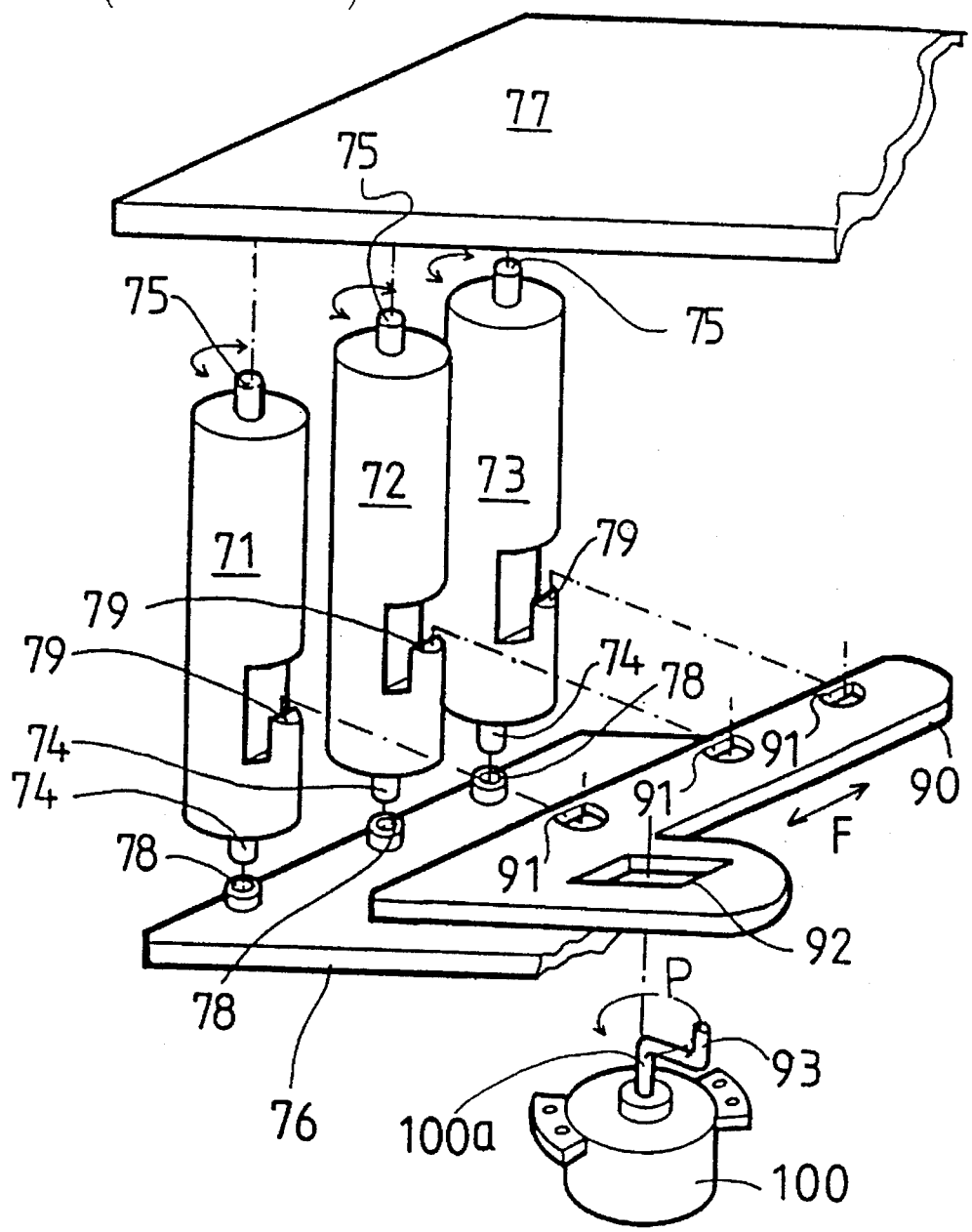
FIG. 20 is an exploded perspective view of an oscillating mechanism for a louver to be connected to a compact motor with a speed reducing mechanism in the related art.

More specifically, as shown in FIG. 19A, a louver 200 of an air conditioner can be directly mounted to the low-speed output shaft 4. FIG. 19B is a cross section taken along the line A—A in FIG. 19A. The louver 200 comprises two fins 101 opposed to each other and two end plates 104 connecting the two fins 101 at both ends. Two oscillating shafts 102 and 103 are formed on the two end plates 104, and a rectangularly cut, upper end of the low-speed output shaft 4 is engaged with a rectangular hole 102a formed in the lower surface of the lower oscillating shaft 102. Thus, the louver 200 can be directly oscillated by the low-speed output shaft 4.

As described above, the compact motor 1 with the speed reducing mechanism in the first preferred embodiment includes the oscillating mechanism comprising the lever 3 fixed to the low-speed output shaft 4, the eccentric cylinder 7a formed integrally with the fourth reduction gear 7 as the final gear of the reduction gear train, and the connecting bar 2 connecting the eccentric cylinder 7a with the lever 3. Accordingly, the low-speed output shaft 4 can be stably oscillated. Further, even when a louver of an air conditioner is directly mounted to the low-speed output shaft 4, cool air is blocked by the cover 16 and is prevented from coming to direct contact with the speed reducing mechanism, thereby preventing the generation of dew on the oscillating mechanism. Accordingly, no waterproof and dustproof covers are required, and the oscillating mechanism can be made compact.

Further, the connecting bar 2 in the compact motor 1 in the first preferred embodiment is formed of an elastic material such as rubber. Accordingly, even when the low-speed output shaft 4 is externally locked, the connecting bar 2 is elastically deformed to permit continuous rotation of the fourth reduction gear 7, thereby preventing breakage of the intermediate reduction gears and abnormal vibration of the rotor 12 due to its locked condition.

A second preferred embodiment of the present invention will now be described with reference to FIGS. 7 to 10, in which the basic construction is substantially the same as that of the first preferred embodiment, and similar parts are denoted by the same reference numerals. The description of such similar parts will be omitted as required, and different parts only will be described hereinafter.

Figure 7:
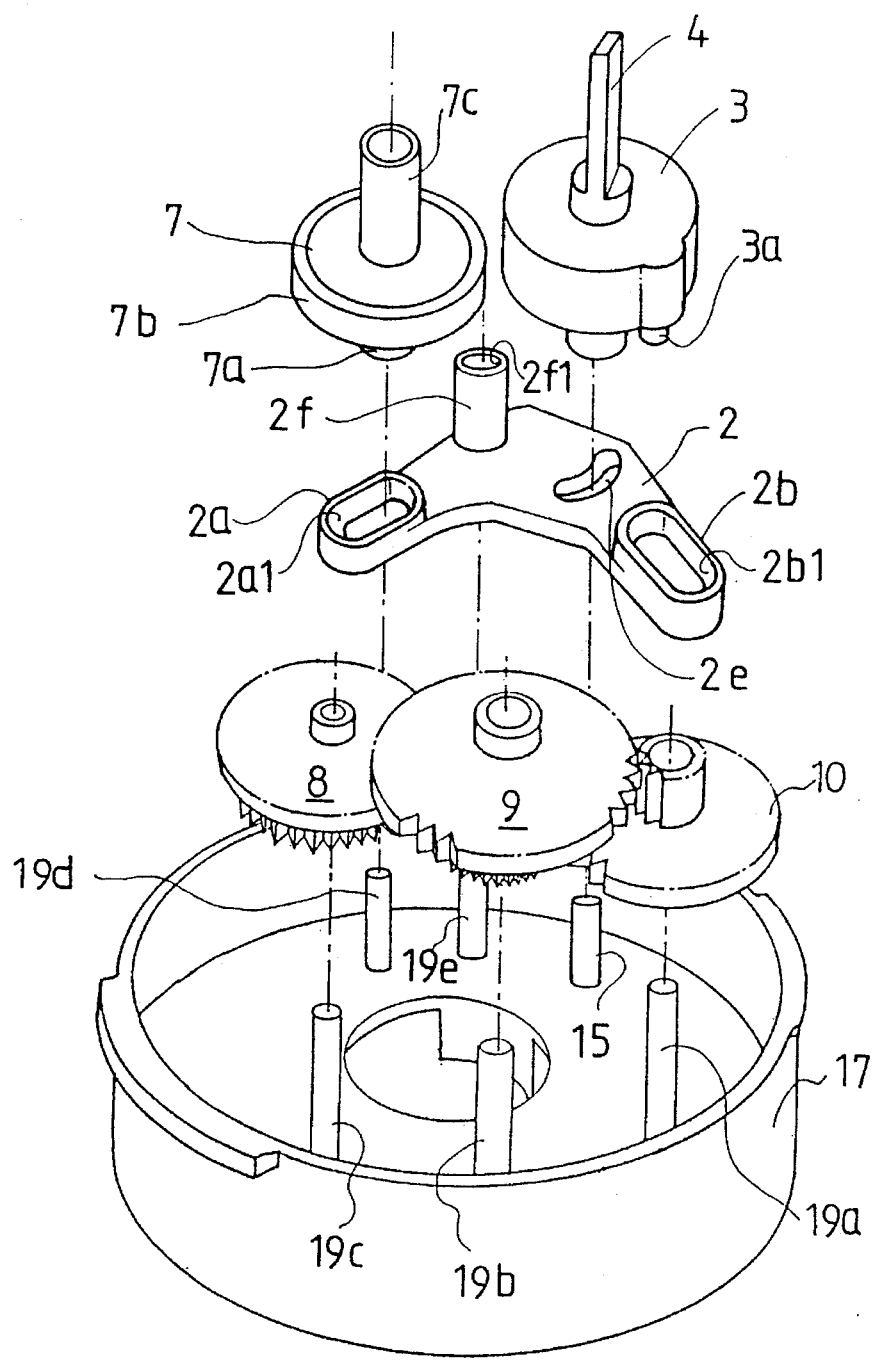
FIG. 7 is an exploded perspective view of a gear case section of a compact motor with a speed reducing mechanism in a second preferred embodiment according to the present invention.
Figure 8:
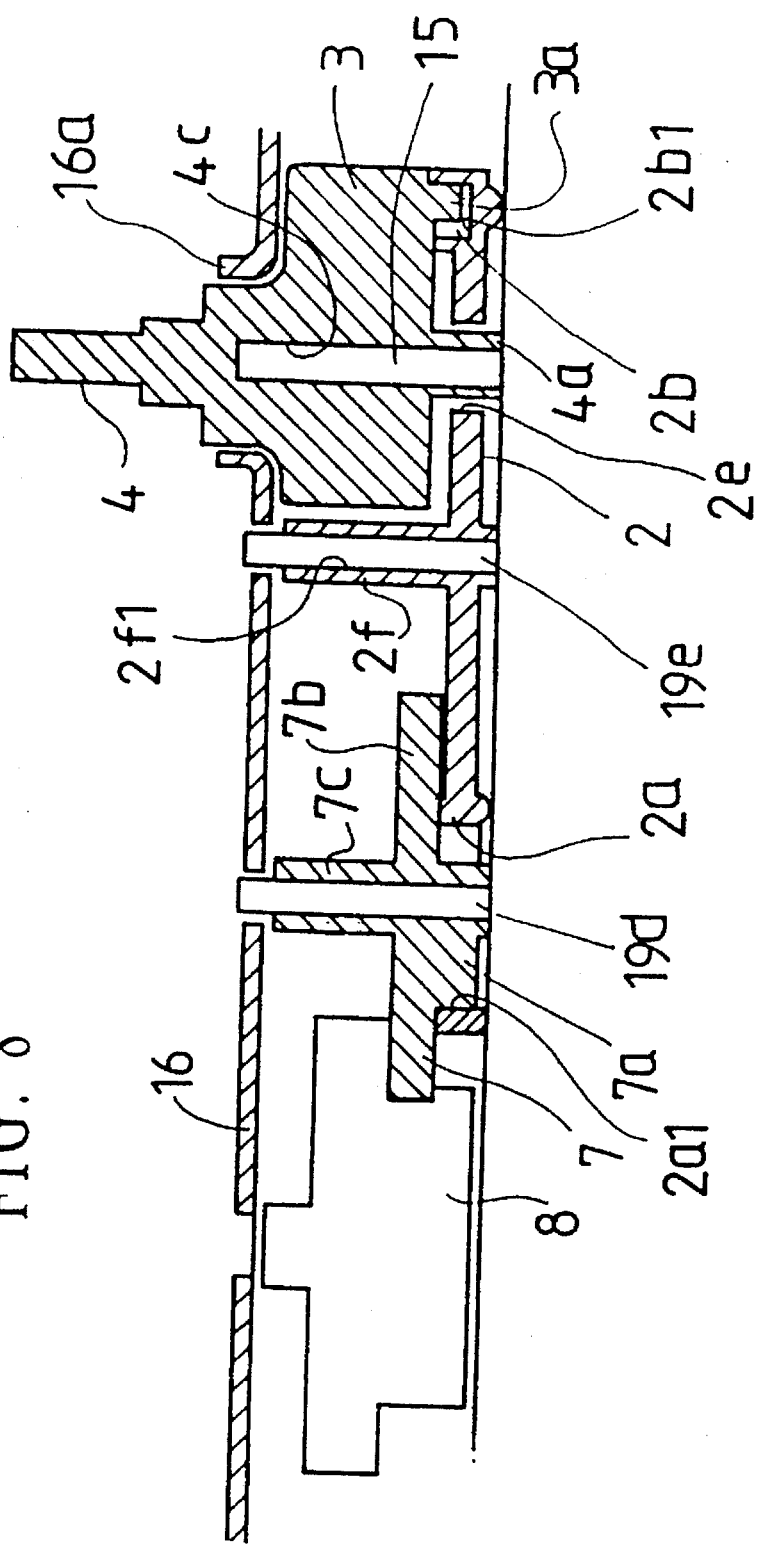
FIG. 8 is a vertical sectional view of an essential part of the compact motor shown in FIG. 7.

As shown in FIGS. 7 and 8, an eccentric cylinder 7a eccentric from a gear shaft 19d is formed integrally on the lower surface of a wheel 7b of a fourth reduction gear 7. A lever 3 and a low-speed output shaft 4 are formed integrally. The low-speed output shaft 4 has an axial hole 4c in which a support shaft 15 is relatively rotatably engaged. The support shaft 15 is fixedly mounted on a bottom plate portion of a gear case 17 so as to stand upright therefrom. An upper shaft portion 4b of the low-speed output shaft 4 is rotatably engaged with a bearing hole 16a of a cover 16. A projection 3a is formed on the lower surface of the lever 3 at an outer peripheral position thereof.

Reference numeral 2 denotes a substantially arcuate connecting bar for connecting the eccentric cylinder 7a with the lever 3. The connecting bar 2 has a pair of connecting portions 2a and 2b at both ends, a hub portion 2f projecting upward at a central portion between the two connecting portions 2a and 2b. The connecting portion 2a has an elongated hole 2a1 in which the eccentric cylinder 7a is rotatably engaged. The connecting portion 2b has an elongated hole 2b1 in which the projection 3a of the lever 3 is rotatably engaged. The hub portion 2f has an axial hole 2f1 in which a support shaft 19e is relatively rotatably engaged.

The support shaft 19e is fixedly mounted on the bottom plate portion of the gear case 17 so as to upright stand therefrom. The support shaft 19e functions as a center of oscillation of the connecting bar 2. The connecting bar 2 is further provided with an arcuate hole 2e in which a lower shaft portion 4a of the low-speed output shaft 4 supported to the support shaft 15 is rotatably engaged.

The operation of an oscillating mechanism constituting an essential part in the second preferred embodiment will now be described with reference to FIGS. 9 and 10.

When the fourth reduction gear 7 is rotated at a low speed, the eccentric cylinder 7a is eccentrically rotated together about the gear shaft 19d.

Figure 9:
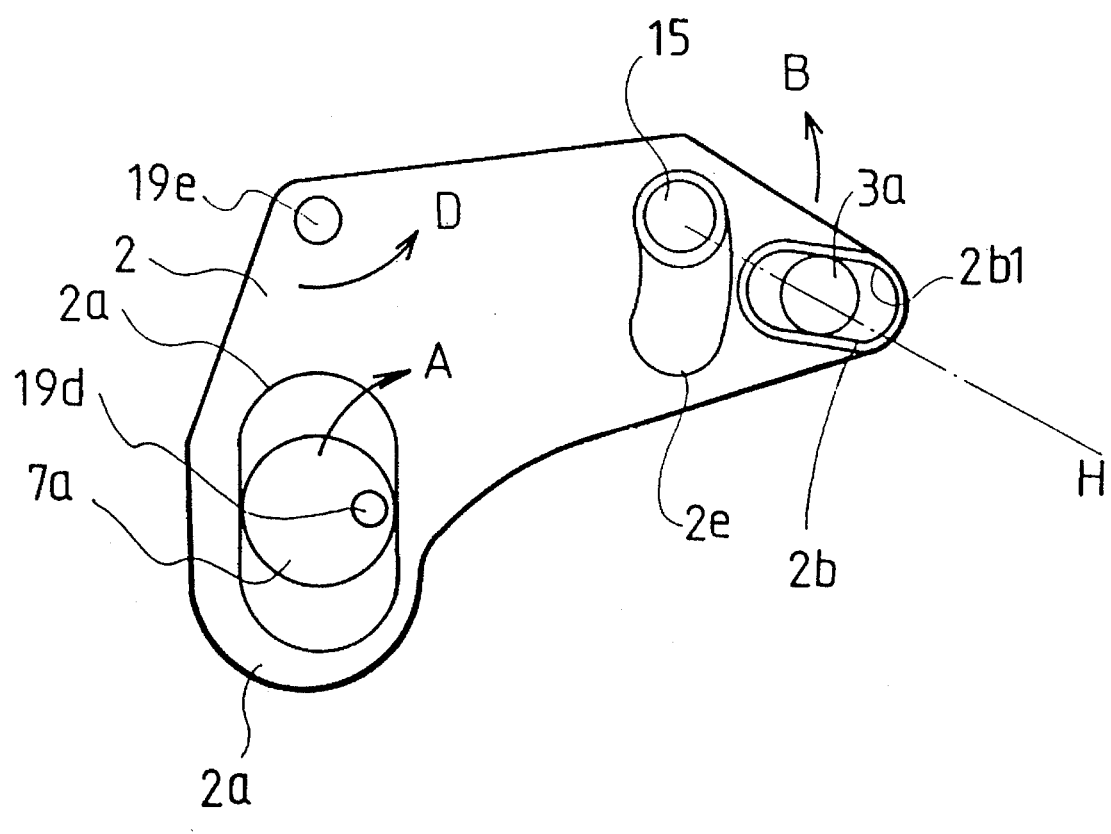
FIGS. 9 and 10 are schematic plan views illustrating the operation of the essential part shown in FIG. 8.

Referring to FIG. 9, when the eccentric cylinder 7a is arcuately rotated about the gear shaft 19d in a direction of arrow A, the connecting bar 2 is swung about the support shaft 19e in a direction of arrow D to thereby arcuately move the projection 3a of the lever 3 about the support shaft 15 in a direction of arrow B.

Figure 10:
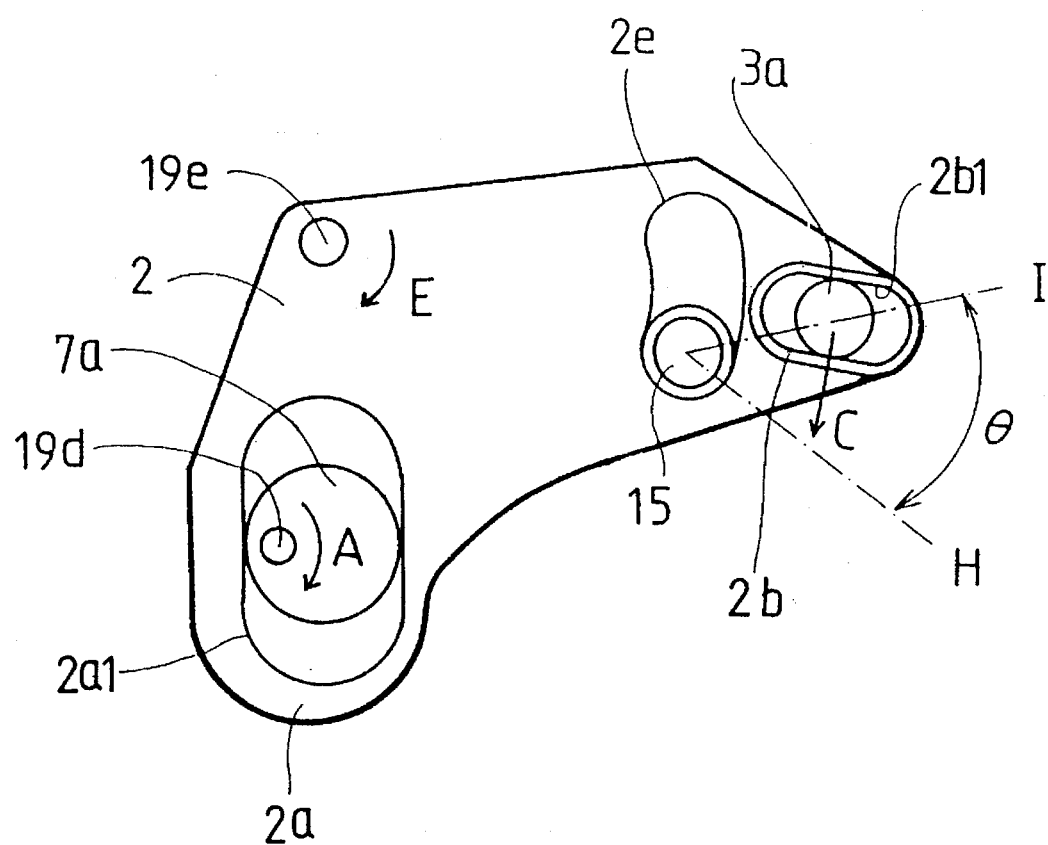

Thereafter, when the eccentric cylinder 7a comes to a position shown in FIG. 10 which is in point symmetry with the position shown in FIG. 9 with respect to the gear shaft 19d, the projection 3a of the lever 3 comes to a position I shown in FIG. 10.

That is, when the eccentric cylinder 7a is rotated at 180°, the projection 3a of the lever 3 is swung at a given angle θ from the position H to the position I about the axis of the low-speed output shaft 4. Thereafter, when the eccentric cylinder 7a is arcuately rotated about the gear shaft 19d in a direction of arrow A shown in FIG. 10, the connecting bar 2 is swung about the support shaft 19e in a direction of arrow E to return the projection 3a of the lever 3 in a direction of arrow C from the position I to the position H.

Accordingly, when the eccentric cylinder 7a is rotated at 360°, the lever 3 is oscillated at the given angle θ (=about 60°) about the axis of the low-speed output shaft 4. Then, a continuous rotation of the eccentric cylinder 7a is converted into a repeated oscillation of the lever 3 at the given angle θ.

Thus, the low-speed output shaft 4 integral with the lever 3 is repeatedly oscillated at the given angle θ at a low speed.

According to the second preferred embodiment, the connecting bar 2 is swingably supported to the support shaft 19e, so that stable oscillatory motion of the connecting bar 2 can be effected. Accordingly, the low-speed output shaft 4 can be more stably oscillated.

A third preferred embodiment of the present invention will now be described with reference to FIGS. 11 and 12, in which the basic construction is substantially the same as that of the first preferred embodiment, and similar parts are denoted by the same reference numerals. The description of such similar parts will be omitted as required, and different parts only will be described hereinafter.

Figure 11:
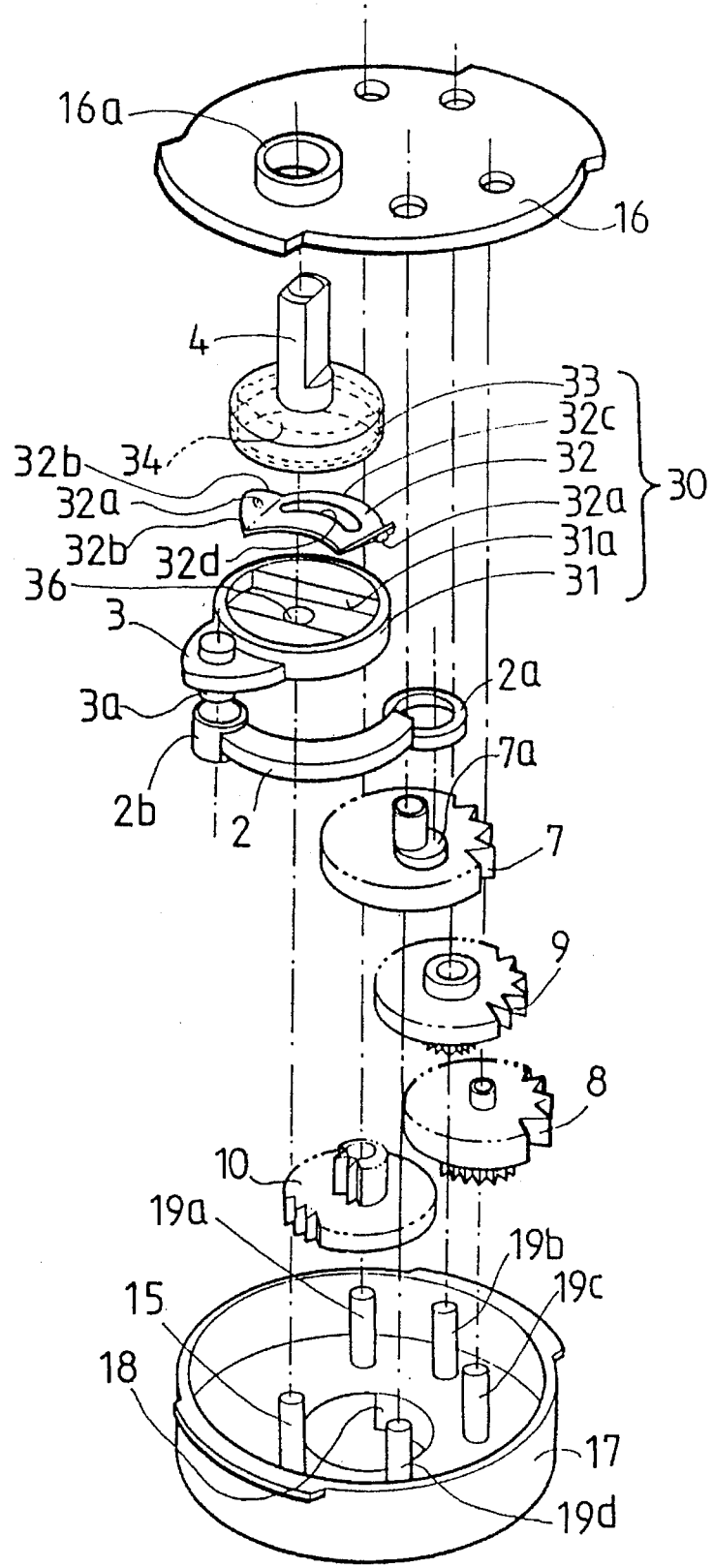
FIG. 11 is an exploded perspective view of a gear case section of a compact motor with a speed reducing mechanism in a third preferred embodiment according to the present invention.
Figure 12:
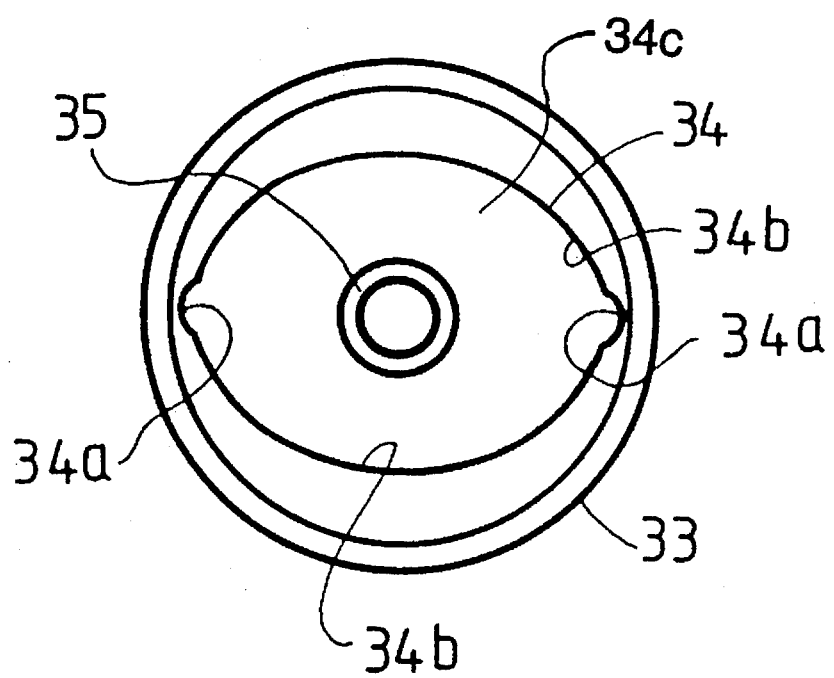
FIG. 12 is a bottom plan view of a cam member shown in FIG. 11.

FIG. 11 is an exploded perspective view showing a gear case section of a compact motor with a speed reducing mechanism in the third preferred embodiment. The gear case section shown in FIG. 11 and the motor section shown in FIG. 3 are combined to obtain the compact motor in the third preferred embodiment.

The speed reducing mechanism in the third preferred embodiment is substantially the same as that in the first preferred embodiment with the exception that a low-speed output shaft 4 is rotatably engaged with a support shaft 15 and that a torque limiter 30 as an essential part is added to the low-speed output shaft 4.

As shown in FIG. 11, the torque limiter 30 comprises a circular coupling member 31 to which a lever 3 is fixed, a clutch spring 32 located in the coupling member 31, and a circular cam member 33 to which the low-speed output shaft 4 is integrally fixed.

The clutch spring 32 is a leaf spring composed of triangular both end portions 32b bent obliquely upward at a given angle and a rectangular intermediate portion 32c curved upward between the both end portions 32b. A semispherical projection 32a is formed by pressing on the outside surface of each end portion 32b. An elongated hole 32d is formed through the intermediate portion 32c.

The upper surface of the circular coupling member 31 is provided with a substantially rectangular groove 31a extending in a diametrical direction of the member 31, so as to fittingly receive the clutch spring 32. Further, a central hole 36 is formed through the coupling member 31. The lever 3 projects sideward from the outer circumferential surface of the coupling member 31, and a projection 3a is formed on the lower surface of the lever 3.

The cam member 33 is mounted on the upper surface of the coupling member 31 with the clutch spring 32 being interposed therebetween. As shown in FIG. 12 which is a bottom plan view of the cam member 33, the lower surface of the cam member 33 is provided with an internal cam 34. The internal cam 34 comprises an elliptic recess 34c and a pair of positioning recesses 34a formed at both ends of the elliptic recess 34c in its major-axial direction. The side surface of the elliptic recess 34c functions as a guide surface 34b for guiding the semispherical projections 32a of the clutch spring 32. The semispherical projections 32a are normally received in the positioning recesses 34a of the internal cam 34 of the cam member 33. Further, a central hole 35 is formed through the cam member 33.

The cam member 33 is integrally fixed to the low-speed output shaft 4 as mentioned above. The support shaft 15 is loosely inserted through the central hole 36 of the coupling member 31, the elongated hole 32d of the clutch spring 32, and the central hole 35 of the cam member 33, thus constructing the torque limiter 30.

The length of the major axis of the elliptic recess 34c of the internal cam 34 is set smaller than the length of the clutch spring 32 in its free condition. Accordingly, the clutch spring 32 retained inside the rectangular groove 31a of the coupling member 31 normally biases the side surface of the internal cam 34. In the stablest condition of the clutch spring 32, the semispherical projections 32a of the clutch spring 32 are received in the positioning recesses 34a of the internal cam 34. Accordingly, the cam member 33, the clutch spring 32, and the coupling member 31 are oscillated together in such a normal condition.

In operation, when an overload is suddenly applied to the low-speed output shaft 4 to stop it during operation of the compact motor 1, the clutch spring 32 retained in the coupling member 31 is moved relative to the cam member 33 to thereby permit continuation of rotation of the rotor.

More specifically, the rotation of the rotor is transmitted through the reduction gears 10, 9, and 8 to the final reduction gear 7, and is converted into an oscillatory motion of the lever 3 by the projection 3a, the eccentric cylinder 7a, and the connecting bar 2. The oscillatory motion of the lever 3 is transmitted to the coupling member 31. Then, the oscillatory motion is transmitted through the clutch spring 32 and the cam member 33 to the output shaft 4. In the event that an overload is applied to the output shaft 4, the projections 32a of the clutch spring 32 are disengaged from the positioning recesses 34a of the internal cam 34 of the clutch member 33 by the torque transmitted from the coupling member 31, because the clutch spring 32 retained in the rectangular groove 31a of the coupling member 31 continues to be oscillated with the coupling member 31. Accordingly, the triangular both end portions 32b of the clutch spring 32 are inwardly compressed and the projections 32a formed at the both end portions 32b slide on the guide surface 34b of the internal cam 34, thus permitting continuation of the rotation of the rotor of the compact motor 1.

During the rotation of the rotor, the coupling member 31 and the clutch spring 32 continue the oscillatory motion, during which the projections 32a of the clutch spring 32 come to engagement with the positioning recesses 34a again. If the overload remains applied to the output shaft 4 at this time, the projections 32a are disengaged from the positioning recesses 34a again to slide on the guide surface 34b.

Thereafter, when the overload applied to the output shaft 4 is removed, the projections 32a slide on the guide surface 34b to come to engagement with the positioning recesses 34a, and the clutch spring 32 and the cam member 33 are oscillated together by the torque transmitted from the coupling member 31. Thus, at the same time the projections 32a come to engagement with the positioning recesses 34a, the output shaft 4 restarts oscillating in synchronism with the coupling member 31. Accordingly, the output shaft 4 can be oscillated always in predetermined positional relationship to the coupling member 31.

As described above, the compact motor 1 in the third preferred embodiment includes the torque limiter 30 comprising the coupling member 31 to which the lever 3 is fixed, the clutch spring 32 retained in the coupling member 31, and the cam member 33 fixed to the output shaft 4 and having the internal cam 34. Accordingly, even when an overload is applied to the output shaft 4, breakage of the intermediate reduction gears and abnormal vibration of the rotor 12 due to its locked condition can be prevented.

Further, when the overload applied to the output shaft 4 is removed, the output shaft 4 is returned to an original oscillatory position or to an oscillatory position slipped at 180° from the original oscillatory position if a strong impact is received. Accordingly, when the compact motor 1 is applied to an oscillating louver of an air conditioner, an oscillatory angle of the louver can be kept constant.

A fourth preferred embodiment of the present invention will now be described with reference to FIG. 13, which is an exploded perspective view of a torque limiter 40. The fourth preferred embodiment is similar to the third preferred embodiment except the torque limiter 40, and the description of the similar parts will therefore be omitted hereinafter.

Figure 13:
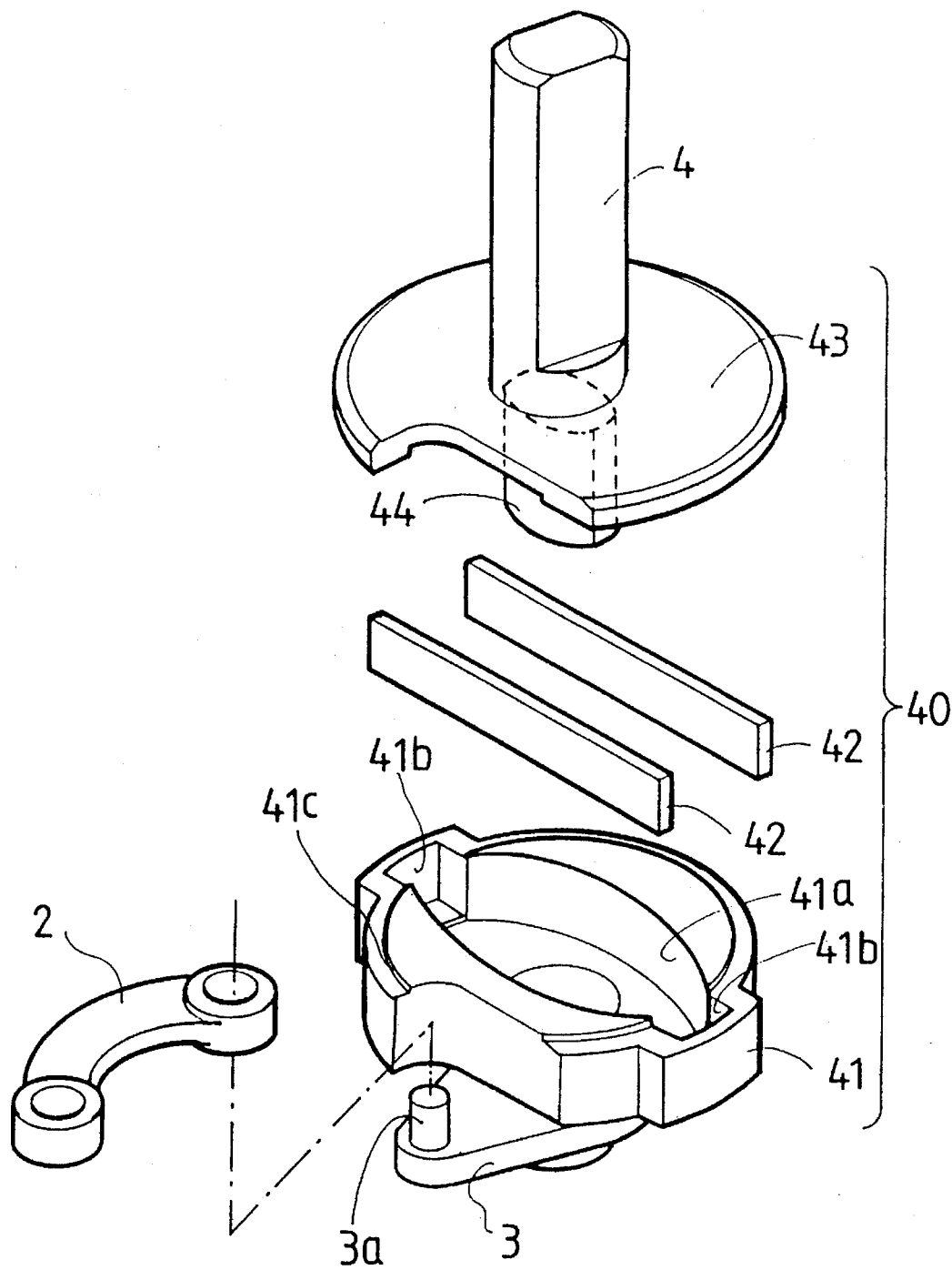
FIG. 13 is an exploded perspective view of a torque limiter provided in a compact motor with a speed reducing mechanism in a fourth preferred embodiment according to the present invention.

Referring to FIG. 13, the torque limiter 40 comprises a substantially circular coupling member 41, two leaf springs 42 retained in the coupling member 41, and a substantially circular cam member 43 mounted on the coupling member 41. A lever 3 having a projection 3a is formed integrally on the lower surface of the coupling member 41 so as to project sideward therefrom. A low-speed output shaft 4 is fixed to the upper surface of the cam member 43 at the center thereof, and an elliptic cam 44 is fixed to the lower surface of the cam member 43 at the center thereof.

The upper surface of the coupling member 41 is provided with an elliptic groove 41a for receiving the two leaf springs 42. Further, two positioning recesses 41b are formed at both ends of the elliptic groove 41a in its major-axial direction, so as to retain both ends of the two leaf springs 42. In the condition where the two leaf springs 42 are received in the elliptic groove 41a and both ends of the two leaf springs 42 are retained in the positioning recesses 41b, the cam 44 is nipped between the two leaf springs 42. Accordingly, the two leaf springs 42 in the elliptic groove 41a are curved along the side surface of the elliptic groove 41a. Further, an outer circumferential projection 43a of the lower surface of the cam member 43 is fixedly fitted with an outer circumferential groove 41c of the upper surface of the coupling member 41.

The low-speed output shaft 4 is normally oscillated in the condition where a minor-axial portion of the cam 44 is nipped between the two leaf springs 42.

In operation, when an overload is suddenly applied to the low-speed output shaft 4 to stop it during operation of the compact motor 1, the leaf springs 42 retained in the coupling member 41 are moved relative to the cam member 43 to thereby permit continuation of rotation of the rotor.

More specifically, the rotation of the rotor is transmitted through the reduction gears 10, 9, and 8 (see FIG. 11) to the final reduction gear 7 (see FIG. 11), and is converted into an oscillatory motion of the lever 3 by the projection 3a, the eccentric cylinder 7a (see FIG. 11), and the connecting bar 2. The oscillatory motion of the lever 3 is transmitted to the coupling member 41. Then, the oscillatory motion is transmitted through the leaf springs 42 and the cam member 43 to the output shaft 4. In the event that an overload is applied to the output shaft 4, the leaf springs 42 are moved relative to the cam 44 and are urged away from each other by a major-axial portion of the cam 44 by the torque transmitted from the coupling member 41, because the leaf springs 42 retained at their both ends in the positioning recesses 41b of the coupling member 41 continues to be oscillated with the coupling member 41. Accordingly, even when the output shaft 4 is stopped, the coupling member 41 continues to be oscillated, thus permitting continuation of the rotation of the rotor of the compact motor 1.

During the rotation of the rotor, the coupling member 41 and the leaf springs 42 continue the oscillatory motion, during which the minor-axial portion of the cam 44 is nipped again between the leaf springs 42. If the overload remains applied to the output shaft 4 at this time, the major-axial portion of the cam 44 is nipped again between the leaf springs 42 to urge them away from each other.

Thereafter, when the overload applied to the output shaft 4 is removed, the minor-axial portion of the cam 44 is nipped between the leaf springs 42, and the leaf springs 42 and the cam member 43 are oscillated together by the torque transmitted from the coupling member 41. Thus, at the same time the minor-axial portion of the cam 44 is nipped between the leaf springs 42, the output shaft 4 restarts oscillating in synchronism with the coupling member 41. Accordingly, the output shaft 4 can be oscillated always in predetermined positional relationship to the coupling member 41.

As described above, the compact motor 1 in the fourth preferred embodiment includes the torque limiter 40 comprising the coupling member 41 to which the lever 3 is fixed, the leaf springs 42 retained in the coupling member 41, and the cam member 43 fixed to the output shaft 4 and having the cam 44. Accordingly, even when an overload is applied to the output shaft 4, breakage of the intermediate reduction gears and abnormal vibration of the rotor 12 due to its locked condition can be prevented.

Further, when the overload applied to the output shaft 4 is removed, the output shaft 4 is returned to an original oscillatory position or to an oscillatory position slipped at 180° from the original oscillatory position if a strong impact is received. Accordingly, when the compact motor 1 is applied to an oscillating louver of an air conditioner, an oscillatory angle of the louver can be kept constant.

A fifth preferred embodiment of the present invention will now be described with reference to FIGS. 14 to 18. The fifth preferred embodiment is similar to the second preferred embodiment except the addition of a torque limiter 80, and the description of the similar parts will therefore be omitted hereinafter.

Figure 14:
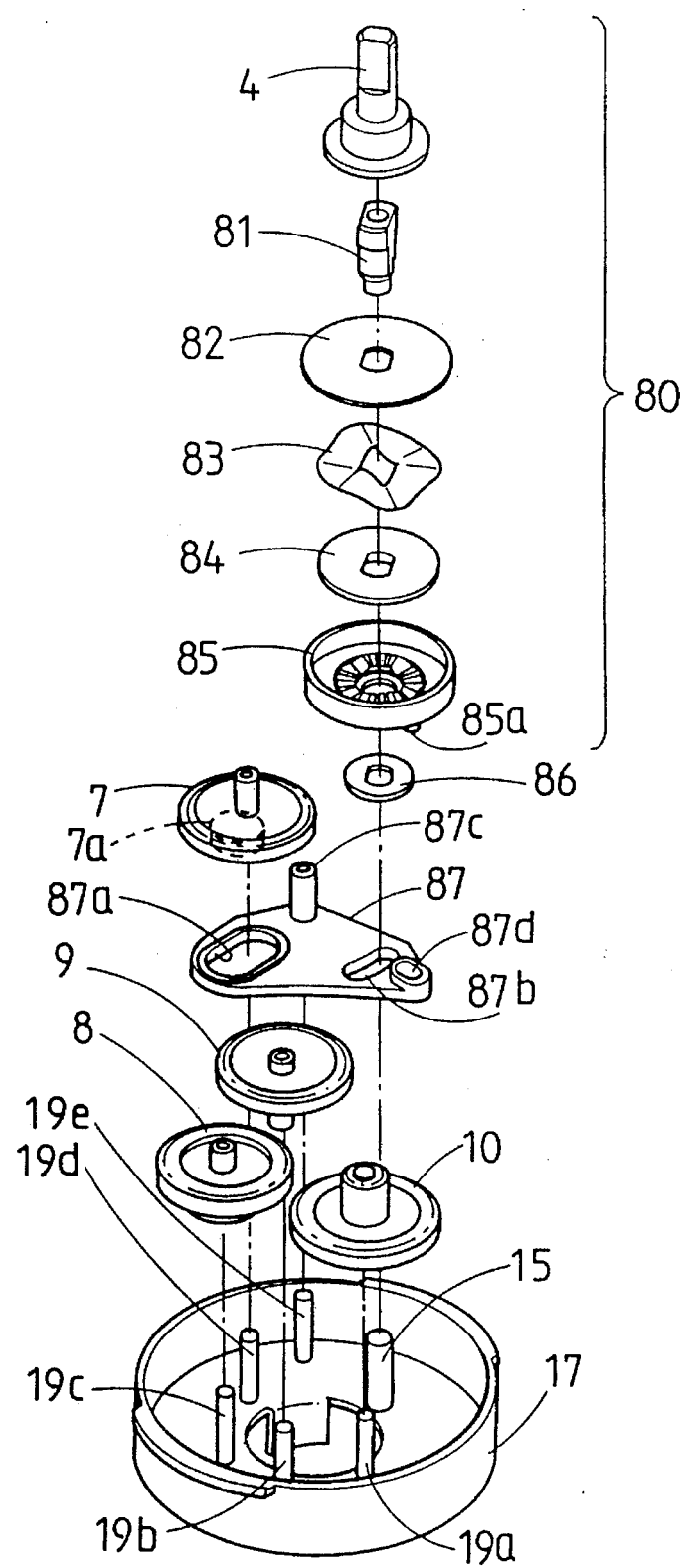
FIG. 14 is an exploded perspective view of a gear case section of a compact motor with a speed reducing mechanism in a fifth preferred embodiment according to the present invention.

Referring to FIG. 14, reference numeral 87 denotes a connecting member for connecting an eccentric cylinder 7a of a final reduction gear 7 to a lever pin 85a formed on the lower surface of a first coupling member 85. The connecting member 87 is pivotally supported through a shaft hole 87c to a support shaft 19e fixedly mounted on a bottom plate portion of a gear case 17. An elongated hole 87a for engaging the eccentric cylinder 7a is formed at one end of the connecting member 87; an elongated hole 87d for engaging the lever pin 85 is formed at the other end of the connecting member 87; and an elongated hole 87b for inserting a support shaft 15 is formed through the connecting member 87 near the elongated hole 87d.

Figure 15:
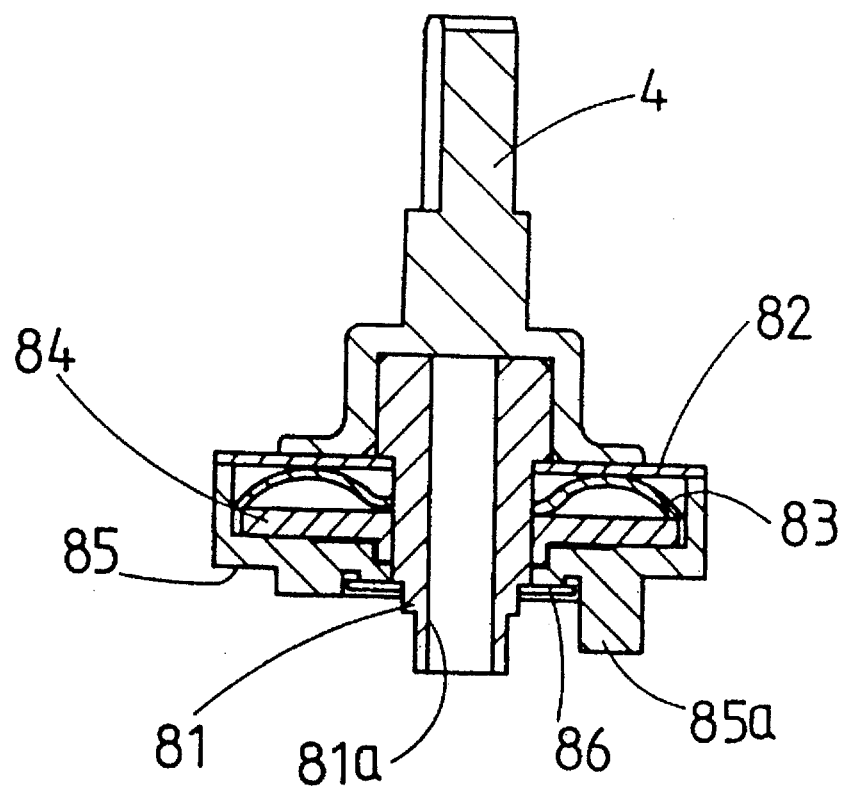
FIG. 15 is a vertical sectional view of a torque limiter shown in FIG. 14.
Figure 16:
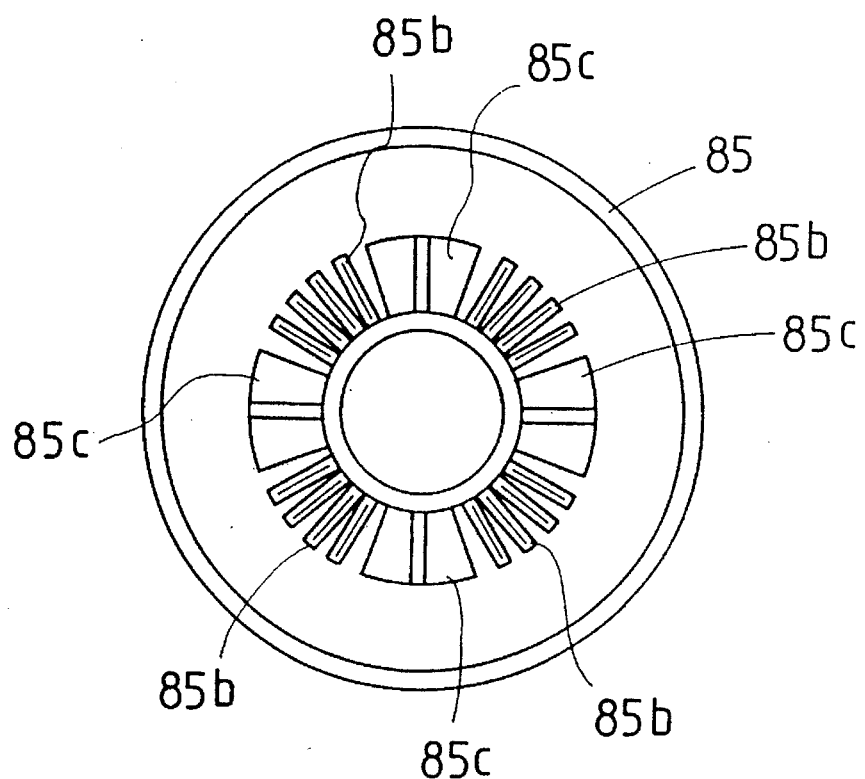
FIGS. 16A and 16B are a top plan view and a bottom plan view of a first coupling member shown in FIG. 14, respectively.
Figure 16:
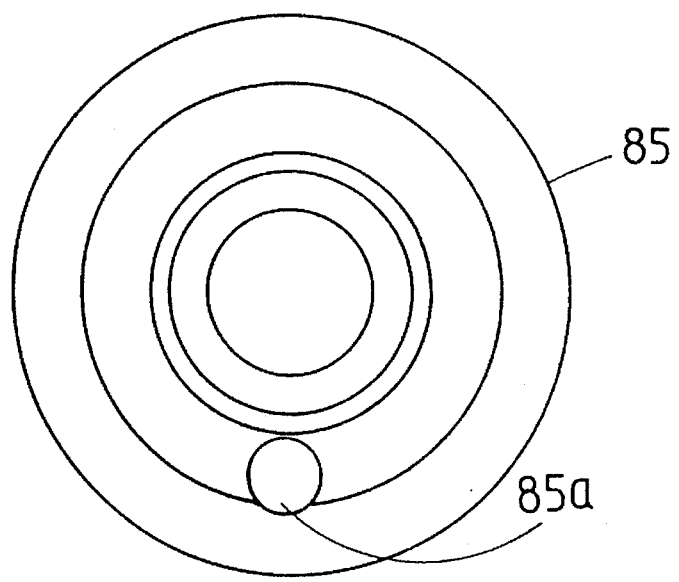
Figure 17:
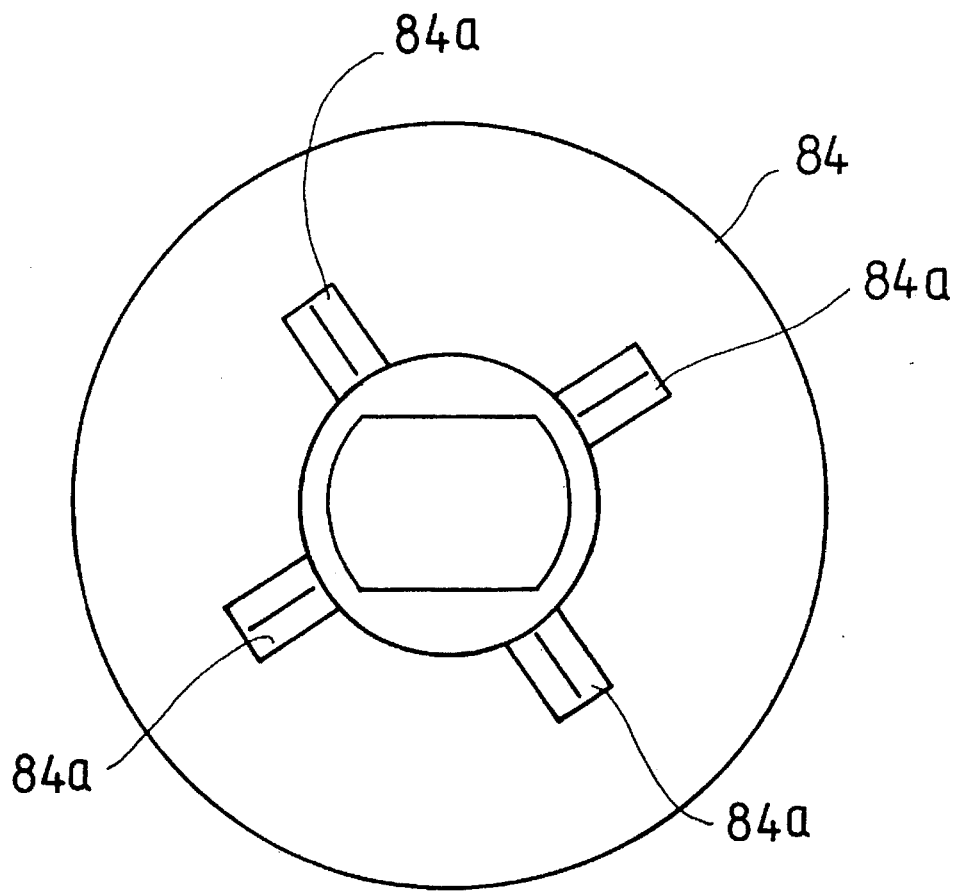
FIGS. 17A and 17B are a plan view and a side elevation of a second coupling member shown in FIG. 14, respectively.
Figure 17:
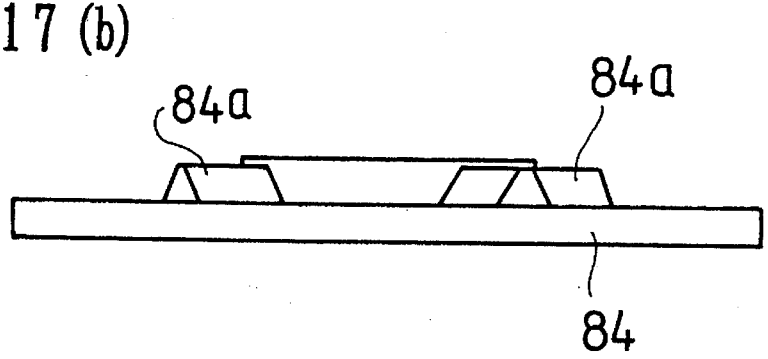

The construction of the torque limiter 80 will now be described. As shown in FIGS. 15 and 16B, the lever pin 85a is formed on the lower surface of the first coupling member 85. As shown in FIG. 16A, a plurality of large recesses 85c and a plurality of small recesses 85b are formed on the upper surface of the first coupling member 85 so as to be alternately arranged in a circumferential direction of the first coupling member 85. These recesses 85c and 85b constitute a plane cam.

A second coupling member 84 is mounted on the upper surface of the first coupling member 85. As shown in FIGS. 17A and 17B, a plurality of projections 84a adapted to engage the large recesses 85c of the first coupling member 85 are formed on the lower surface of the second coupling member 84. A waved spring 83 is mounted on the upper surface of the second coupling member 84 so as to bias the second coupling member 84 against the first coupling member 85. A washer 82 for retaining the waved spring 83 is mounted on the outer circumferential portion of the first coupling member 85. The washer 82 is integrally connected to the low-speed output shaft 4 by a joint member 81. Further, a washer 86 is fitted with a lower portion of the joint member 81 and is interposed between the first coupling member 85 and the connecting member 87. Thus, the washer 82, the waved spring 83, the second coupling member 84, the first coupling member 85, and the washer 86 are assembled together by the joint member 81 to construct the torque limiter 80.

The waved spring 83 exerts a biasing force for biasing the second coupling member 84 against the first coupling member 85 to such an extent that the plane cam does not slip under a normal torque. Accordingly, the torque limiter 80 is normally oscillated by the torque transmitted from the connecting member 87 under the condition where the projections 84a of the second coupling member 84 are engaged with the large recesses 85c of the first coupling member 85.

Figure 18:
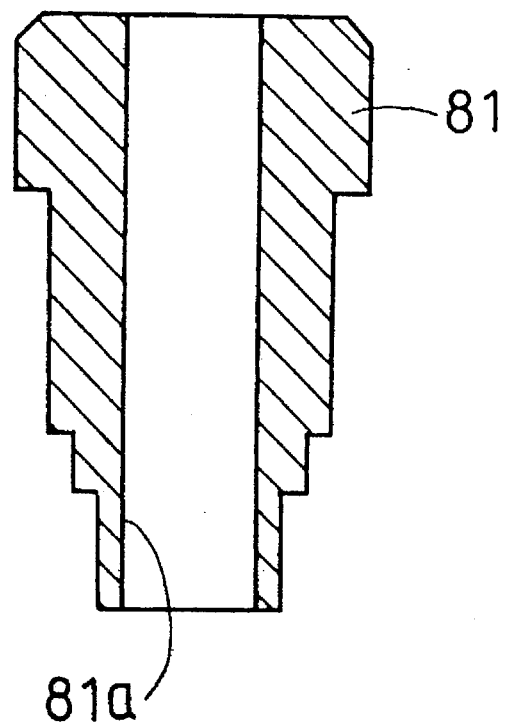
FIG. 18 is a vertical sectional view of a joint member shown in FIG. 14.

As shown in FIG. 18, the joint member 81 is provided with a central hole 81a for loosely inserting the support shaft 15. Thus, the torque limiter 80 is oscillatably mounted on the support shaft 15 fixed to the gear case 17. The lower portion of the joint member 81 is engaged with the elongated hole 87b of the connecting member 87. Further, the lever pin 85a of the first coupling member 85 is engaged with the elongated hole 87d of the connecting member 87.

In operation, when the final reduction gear 7 is rotated at a low speed, the eccentric cylinder 7a is eccentrically rotated about the gear shaft 19d. Accordingly, the connecting member 87 connected to the eccentric cylinder 7a is oscillated about the support shaft 19e, and the first coupling member 85 receives the oscillatory motion of the connecting member 87 through the lever pin 85a to repeatedly oscillate at a given angle. As a result, the low-speed output shaft 4 is repeatedly oscillated at the given angle at a low speed. According to the fifth preferred embodiment, the connecting member 87 is supported to the support shaft 19e. Therefore, the oscillatory motion of the connecting member 87 can be stabilized to thereby effect a stabler oscillatory motion of the low-speed output shaft 4.

When an overload is suddenly applied to the low-speed output shaft 4 to stop it during operation of the compact motor 1, the first coupling member 85 is moved relative to the second coupling member 84 to thereby permit continuation of rotation of the rotor.

More specifically, the rotation of the rotor is transmitted through the reduction gears 10, 9, and 8 to the final reduction gear 7, and is converted into an oscillatory motion of the lever pin 85a by the eccentric cylinder 7a and the connecting member 87. The oscillatory motion of the lever pin 85a is transmitted to the first coupling member 85. Then, the oscillatory motion is transmitted through the second coupling member 84 and the waved spring 83 to the output shaft 4. In the event that an overload is applied to the output shaft 4, the large recesses 85c of the first coupling member 85 are disengaged from the projections 84a of the second coupling member 84 against the biasing force of the waved spring 83 by the torque transmitted from the connecting member 87. Accordingly, the plane cam constituted of the large recesses 85c and the small recesses 85b of the first coupling member 85 is stepwise moved relative to the projections 84a of the second coupling member 84, thus permitting continuation of the rotation of the rotor of the compact motor 1.

During the rotation of the rotor, the first coupling member 85 continues the oscillatory motion, during which the large recesses 85c of the first coupling member 85 come to engagement with the projections 84a of the second coupling member 84 again. If the overload remains applied to the output shaft 4 at this time, the large recesses 85c are disengaged from the projections 84a again.

Thereafter, when the overload applied to the output shaft 4 is removed, the large recesses 85c move relative to the projections 84a to come to engagement with the projections 84a, and the first coupling member 85 and the second coupling member 84 are oscillated together by the torque transmitted from the connecting member 87. Thus, at the same time the large recesses 85c come to engagement with the projections 84a, the output shaft 4 restarts oscillating in synchronism with the first coupling member 85. Accordingly, the output shaft 4 can be oscillated always in predetermined positional relationship to the first coupling member 85. In this case, in order to return a louver connected to the compact motor 1 to a predetermined position, it is necessary to provide a stopper (not shown) at a position just outside a normal operational range of the louver.

As described above, the compact motor 1 in the fifth preferred embodiment includes the torque limiter 80 comprising the first coupling member 85 to which the lever pin 85a is fixed and having the plane cam composed of the elements 85b and 85c, the second coupling member 84 having the projections 84a and adapted to oscillate integrally with the output shaft 4, and the waved spring 83 for biasing the second coupling member 84 against the first coupling member 85. Accordingly, even when an overload is applied to the output shaft 4, breakage of the intermediate reduction gears and abnormal vibration of the rotor 12 due to its locked condition can be prevented.

Further, when the overload applied to the output shaft 4 is removed, the output shaft 4 is returned to an original oscillatory position. Accordingly, when the compact motor 1 is applied to an oscillating louver of an air conditioner, an oscillatory angle of the louver can be kept constant.

Further, the torque limiter in the fifth preferred embodiment is easier to assembly and accordingly better in workability than the torque limiters in the third and fourth preferred embodiments. Additionally, the spring can be stably fixed to thereby obtain stable overload characteristics of the torque limiter.

While specific embodiments of the compact motor 1 have been described, it is to be appreciated that the present invention is not limited to the above preferred embodiments, but various modifications may be made.

For example, the final reduction gear 7 and the eccentric cylinder 7a may be formed as independent parts and they may be connected together by means of a pin or the like rather than integrally forming the final reduction gear 7 with the eccentric cylinder 7a.

A grooved cam may be formed on the upper or lower surface of the final reduction gear 7 and one end of the connecting bar or member may be engaged with the grooved cam rather than forming the eccentric cylinder 7a as a cam for oscillation.

A coned disc spring, a coil spring, etc. may be used as the spring member instead of the leaf spring.

Further, although the two or four fixed positions angularly spaced at 180° or 90° are set in the above preferred embodiments, any plural fixed positions angularly spaced at an arbitrary angle may be set as required.

What is claimed is:

1. In a compact motor with a speed reducing mechanism, including a cylindrical casing having an open end, a stator fixedly provided in said casing, an exciting coil provided in said casing, a rotor provided in said casing and having a high-speed output shaft on which a pinion is fixed, a cover for covering said open end of said casing, a low-speed output shaft projecting from a hole formed through said cover for connection to a device adjustable through a range of angular positions, and a reduction gear train interposed between said pinion and said low-speed output shaft for transmitting power to said low-speed output shaft, the reduction gear train having a final gear supported by a gear shaft; the improvement comprising:

a lever connected to said low-speed output shaft;

an eccentric cylinder formed integrally with said final gear and rotatable eccentrically about said gear shaft and having an outer circumference; and a connecting member having one end pivotally engaging with the outer circumference of said eccentric cylinder and another end pivotally engaging with said lever, said connecting member having a circular hole pivotally engaging with a support shaft, so that said connecting member is oscillated about said support shaft.

2. In a compact motor with a speed reducing mechanism, including a cylindrical casing having an open end, a stator fixedly provided in said casing, an exciting coil provided in said casing, a rotor provided in said casing and having a high-speed output shaft on which a pinion is fixed a cover for covering said open end of said casing, a low-speed output shaft projecting from a hole formed through said cover for connection to a device adjustable through a range of angular positions, and a reduction gear train interposed between said pinion and said low-speed output shaft for transmitting power to said low-speed output shaft, the reduction gear train having a final gear supported by a gear shaft; the improvement comprising:

a lever connected to said low-speed output shaft;

an eccentric cylinder formed integrally with said final gear and rotatable eccentrically about said gear shaft and having an outer circumference;

a connecting member having one end pivotally engaging with the outer circumference of said eccentric cylinder and another end pivotally engaging with said lever; and a torque limiter interposed between said low-speed output shaft and said lever, wherein said low-speed output shaft is fixed to an output of said torque limiter at a central position thereof, and said lever is fixed to an input of said torque limiter at a position eccentric from the central position;

said connecting member having a first elongated hole pivotally engaging with the outer circumference of said eccentric cylinder, a second elongated hole pivotally engaging with said lever, and a circular hole pivotally engaging with a support shaft, so that said connecting member is oscillated about said support shaft.

3. The compact motor with a speed reducing mechanism according to claim 1, further comprising a torque limiter interposed between said low-speed output shaft and said lever, wherein said low-speed output shaft is fixed to an output of said torque limiter at a central position thereof, and said lever is fixed to an input of said torque limiter at a position eccentric from the central position.

4. The compact motor with a speed reducing mechanism according to claim 3, wherein said torque limiter comprises:

a first coupling member to which said lever is fixed at said eccentric position, said first coupling member having a contact surface formed with a plurality of recesses arranged in a circumferential direction at regular intervals;

a second coupling member to which said low-speed output shaft is fixedly mounted at said central position, said second coupling member having a contact surface formed with a plurality of projections adapted to releasably engage with said recesses of said contact surface of said first coupling member; and a spring member for biasing said second coupling member against said first coupling member.

5. The compact motor with a speed reducing mechanism according to claim 4, wherein said first coupling member is normally held in a plurality of predetermined oscillatory positions by a biasing force of said spring member.

6. The compact motor with a speed reducing mechanism according to claim 3, wherein said torque limiter comprises:

a coupling member to which said lever is fixed at said eccentric position;

a cam member to which said low-speed output shaft is fixed at said central position; and a spring member retained in said coupling member for biasing said cam member.

7. The compact motor with a speed reducing mechanism according to claim 6, wherein said cam member is normally held in a plurality of predetermined oscillatory positions by a biasing force of said spring member.

* * * * *

UNITED STATES PATENT AND TRADEMARK OFFICE
CERTIFICATE OF CORRECTION

PATENT NO.   : 5,581,138
DATED        : December 3, 1996
INVENTOR(S)  : Tukamoto et al.

It is certified that error appears in the above-indentified patent and that said Letters Patent is hereby corrected as shown below:

Claim 2, col. 14, penultimate line after "fixed" insert --,--.

Signed and Sealed this

Fourth Day of March, 1997

*Attest:*

BRUCE LEHMAN

*Attesting Officer*    *Commissioner of Patents and Trademarks*